United States Patent
Gao et al.

(10) Patent No.: US 12,407,397 B2
(45) Date of Patent: Sep. 2, 2025

(54) MULTI-TRP TRANSMISSION

(71) Applicant: NEC CORPORATION, Tokyo (JP)

(72) Inventors: Yukai Gao, Beijing (CN); Gang Wang, Beijing (CN)

(73) Assignee: NEC CORPORATION, Tokyo (JP)

( * ) Notice: Subject to any disclaimer, the term of this patent is extended or adjusted under 35 U.S.C. 154(b) by 300 days.

(21) Appl. No.: 17/277,167

(22) PCT Filed: Sep. 18, 2018

(86) PCT No.: PCT/CN2018/106257
§ 371 (c)(1),
(2) Date: Mar. 17, 2021

(87) PCT Pub. No.: WO2020/056591
PCT Pub. Date: Mar. 26, 2020

(65) Prior Publication Data
US 2024/0259078 A1    Aug. 1, 2024

(51) Int. Cl.
*H04B 7/06* (2006.01)
*H04L 5/00* (2006.01)
*H04W 72/232* (2023.01)

(52) U.S. Cl.
CPC ....... *H04B 7/06968* (2023.05); *H04L 5/0048* (2013.01); *H04W 72/232* (2023.01)

(58) Field of Classification Search
CPC ............ H04B 7/06968; H04W 72/232; H04L 5/0048
(Continued)

(56) References Cited

U.S. PATENT DOCUMENTS

2019/0296876 A1* 9/2019 Zhang .................. H04L 5/0048
2019/0379506 A1* 12/2019 Cheng .................. H04W 88/06
(Continued)

FOREIGN PATENT DOCUMENTS

WO    2019/215888 A1    11/2019

OTHER PUBLICATIONS

Ericsson, "Remaining details of beam management", 3GPP TSG-RAN WG1 #91, R1-1721366, Internet<URL:http://www.3gpp.org/ftp/tsg_ran/WG1_RL1/TSGR1_91/Docs/R1-1721366.zip>, Nov. 29, 2017 (13 pages total).
(Continued)

*Primary Examiner* — Basil Ma
(74) *Attorney, Agent, or Firm* — Sughrue Mion, PLLC

(57) ABSTRACT

Embodiments of the present disclosure relate to methods, devices and computer readable media for multi-TRP transmission. The method comprises determining at least one transmission configuration indication (TCI) state to be configured to a terminal device, the at least one TCI state indicating a plurality of reference signal (RS) sets and quasi co-location relationship between the plurality of RS sets and respective groups of DMRS ports. The method further comprises determining DMRS ports for transmitting DMRSs to the terminal device via the plurality of TRPs and associations between the plurality of RS sets and the DMRS ports. In addition, the method further comprises configuring the at least one TCI state, the DMRS ports, and the associations between the plurality of RS sets and the DMRS ports to the terminal device. In this way, multi-TRP transmission can be supported without introducing additional indication overhead.

18 Claims, 7 Drawing Sheets

(58) Field of Classification Search
USPC .......................................................... 370/329
See application file for complete search history.

(56) References Cited

U.S. PATENT DOCUMENTS

| 2020/0177416 | A1* | 6/2020 | Jiang | .................... H04L 25/0226 |
| 2020/0221487 | A1* | 7/2020 | Lee | ........................ H04L 5/0091 |
| 2021/0306191 | A1* | 9/2021 | Lin | ........................ H04L 1/0061 |
| 2022/0150975 | A1* | 5/2022 | Agiwal | ............. H04W 74/0836 |

OTHER PUBLICATIONS

Zte et al., "Details and evaluation results on beam indication", 3GPP TSG RAN WG1 #91 R1-1719538, Internet<URL:http://www.3gpp.org/ftp/tsg_ran/WG1_RL1/TSGR1_91/Docs/R1-1719538.zip>, Nov. 18, 2017 (12 pages total).

Office Action dated Sep. 6, 2022 from the Japanese Patent Office in JP Application No. 2021-538874.

Qualcomm, "Final Issues for Rel-15 PDSCH/PUSCH's DM-RS [online]", 3GPP TSG RAN WG1 Meeting 91 R1-1721686, Nov. 27-Dec. 1, 2017, pp. 1-26.

Communication dated Apr. 18, 2023 in Japanese Patent Application No. 2021-538874.

Huawei, Hisilicon, "TP for single-PDCCH NCJT in Rel-15", 3GPP TSG RAN WG1 Meeting #92, R1-1802542, Feb. 26-Mar. 2, 2018, pp. 1-3, Athens, Greece.

Huawei, Hisilicon, "Remaining issues on QCL", 3GPP TSG RAN WG1 Meeting #92, R1-1801461, Feb. 26-Mar. 2, 2018, pp. 1-3, Athens, Greece.

Ericsson, "CSI feedback for multi-TRP", 3GPP TSG-RAN WG1 #91, R1-1720974, Nov. 27-Dec. 1, 2017, pp. 1-7, Reno, USA.

Samsung, "Discussion on DL/UL multi-TRP/-panel supports", 3GPP TSG RAN WG1 Meeting 90bis, R1-1717598, Oct. 9-13, 2017, pp. 1-8, Prague, CZ.

International Search Report of PCT/CN2018/106257 dated Jun. 24, 2019 [PCT/ISA/210].

Written Opinion of PCT/CN2018/106257 dated Jun. 24, 2019 [PCT/ISA/237].

* cited by examiner

MULTI-TRP TRANSMISSION

CROSS REFERENCE TO RELATED APPLICATIONS

This application is a National Stage of International Application No. PCT/CN2018/106257, filed Sep. 18, 2018.

TECHNICAL FIELD

Embodiments of the present disclosure generally relate to wireless communication, and in particular, to methods, devices and computer readable media for multi-TRP transmission.

BACKGROUND

The latest developments of the Third Generation Partnership Project (3GPP) standards are referred to as Long Term Evolution (LTE) of Evolved Packet Core (EPC) network and Evolved UMTS Terrestrial Radio Access Network (E-UTRAN), also commonly termed as '4G'. In addition, the term '5G New Radio (NR)' refers to an evolving communication technology that is expected to support a variety of applications and services. 5G NR is part of a continuous mobile broadband evolution promulgated by 3GPP to meet new requirements associated with latency, reliability, security, scalability (e.g., with Internet of Things (IoT)), and other requirements.

Recently, the study of NR system is approved. The NR will consider frequency ranges up to 100 GHz with the objective of a single technical framework addressing all defined usage scenarios, requirements and deployment scenarios, including enhanced mobile broadband, massive machine-type-communications, and ultra-reliable and low latency communications. In NR, a network device (for example, a next generation NodeB (gNB)) may be equipped with multiple Transmission and Reception Points (TRPs) or antenna panels. That is, the network device can communicate with a terminal device (for example, a user equipment (UE)) via one or more of the multiple TRPs or antenna panels. Discussion of multi-antenna scheme for new radio access has been started, including multi-antenna scheme, beam management, channel state information (CSI) acquisition, and reference signal and quasi co-location (QCL). Also, single-TRP transmission and multi-TRP transmission have been agreed in NR. However, details about multi-TRP/panel transmission have not been specified.

SUMMARY

In general, example embodiments of the present disclosure provide methods, devices and computer readable media for multi-TRP transmission.

In a first aspect, there is provided a method implemented at a network device. The method comprises determining at least one transmission configuration indication (TCI) state to be configured to a terminal device, the at least one TCI state indicating a plurality of reference signal (RS) sets and quasi co-location relationship between the plurality of RS sets and respective groups of DMRS ports, the network device communicating with the terminal device via a plurality of Transmission and Reception Points (TRPs) associated with the plurality of RS sets. The method further comprises determining DMRS ports for transmitting DMRSs to the terminal device via the plurality of TRPs and associations between the plurality of RS sets and the DMRS ports. In addition, the method further comprises configuring the at least one TCI state, the DMRS ports, and the associations between the plurality of RS sets and the DMRS ports to the terminal device.

In a second aspect, there is provided a method implemented at a terminal device. The method comprises receiving, from a network device communicating with the terminal device via a plurality of Transmission and Reception Points (TRPs), configurations about DMRS ports for receiving DMRSs via the plurality of Transmission and Reception Points (TRPs), at least one transmission configuration indication (TCI) state indicating a plurality of reference signal (RS) sets associated with the plurality of TRPs, and associations between the plurality of RS sets and the DMRS ports. The method further comprises determining, from the configurations, the at least one TCI state, the DMRS ports, and the associations between the plurality of RS sets and the DMRS ports. In addition, the method further comprises receiving, via the plurality of TRPs and based on the at least one TCI state and the associations between the plurality of RS sets and the DMRS ports, the DMRSs on the DMRS ports from the network device.

In a third aspect, there is provided a network device. The network device comprises a processor and a memory coupled to the processor. The memory stores instructions that when executed by the processor, cause the network device to perform actions. The actions comprise: determining at least one transmission configuration indication (TCI) state to be configured to a terminal device, the at least one TCI state indicating a plurality of reference signal (RS) sets and quasi co-location relationship between the plurality of RS sets and respective groups of DMRS ports, the network device communicating with the terminal device via a plurality of Transmission and Reception Points (TRPs) associated with the plurality of RS sets; determining DMRS ports for transmitting DMRSs to the terminal device via the plurality of TRPs and associations between the plurality of RS sets and the DMRS ports; and configuring the at least one TCI state, the DMRS ports, and the associations between the plurality of RS sets and the DMRS ports to the terminal device.

In a fourth aspect, there is provided a terminal device. The terminal device comprises a processor and a memory coupled to the processor. The memory stores instructions that when executed by the processor, cause the terminal device to perform actions. The actions comprise: receiving, from a network device communicating with the terminal device via a plurality of Transmission and Reception Points (TRPs), configurations about DMRS ports for receiving DMRSs via the plurality of Transmission and Reception Points (TRPs), at least one transmission configuration indication (TCI) state indicating a plurality of reference signal (RS) sets associated with the plurality of TRPs, and associations between the plurality of RS sets and the DMRS ports; determining, from the configurations, the at least one TCI state, the DMRS ports, and the associations between the plurality of RS sets and the DMRS ports; and receiving, via the plurality of TRPs and based on the at least one TCI state and the associations between the plurality of RS sets and the DMRS ports, the DMRSs on the DMRS ports from the network device.

In a fifth aspect, there is provided a computer readable medium having instructions stored thereon. The instructions, when executed on at least one processor, cause the at least one processor to carry out the method according to the first aspect of the present disclosure.

In a sixth aspect, there is provided a computer readable medium having instructions stored thereon. The instructions, when executed on at least one processor, cause the at least one processor to carry out the method according to the second aspect of the present disclosure.

In a seventh aspect, there is provided a computer program product that is tangibly stored on a computer readable storage medium. The computer program product includes instructions which, when executed on at least one processor, cause the at least one processor to carry out the method according to the first aspect or the second aspect of the present disclosure.

Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Principle of the present disclosure will now be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the singular forms 'a', 'an' and 'the' are intended to include the plural forms as well, unless the context clearly indicates otherwise. The term 'includes' and its variants are to be read as open terms that mean 'includes, but is not limited to.' The term 'based on' is to be read as 'at least in part based on.' The term 'one embodiment' and 'an embodiment' are to be read as 'at least one embodiment.' The term 'another embodiment' is to be read as 'at least one other embodiment.' The terms 'first,' 'second,' and the like may refer to different or same objects. Other definitions, explicit and implicit, may be included below.

In some examples, values, procedures, or apparatus are referred to as 'best,' 'lowest,' 'highest,' 'minimum,' 'maximum,' or the like. It will be appreciated that such descriptions are intended to indicate that a selection among many used functional alternatives can be made, and such selections need not be better, smaller, higher, or otherwise preferable to other selections.

Figure 1A:
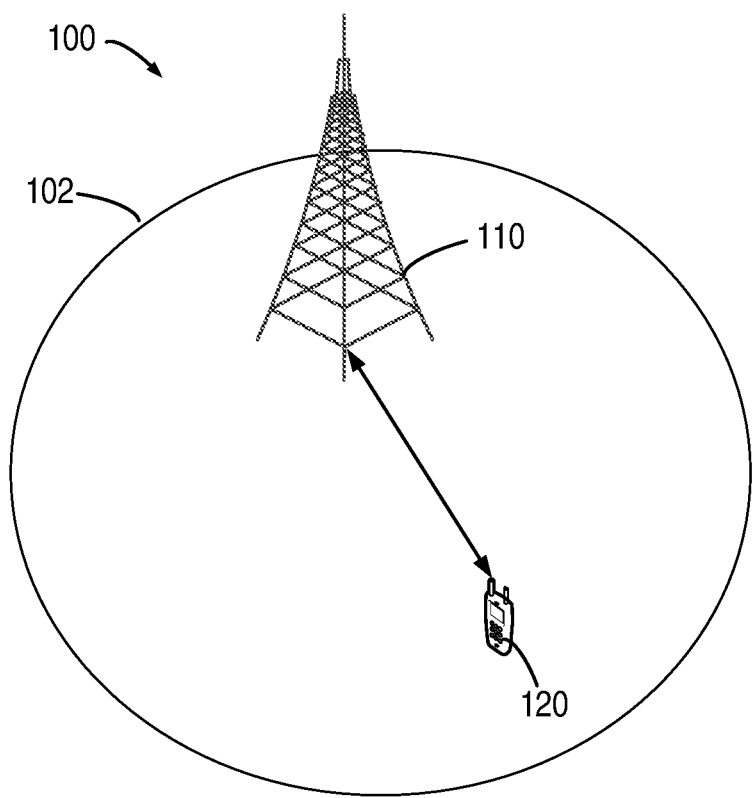
FIGS. 1A-1B illustrate an example communication network in which embodiments of the present disclosure can be implemented.

FIG. 1A shows an example communication network 100 in which embodiments of the present disclosure can be implemented. The network 100 includes a network device 110 and a terminal device 120 served by the network device 110. The network 100 may provide one or more serving cells 102 to serve the terminal device 120. It is to be understood that the number of network devices, terminal devices and/or serving cells is only for the purpose of illustration without suggesting any limitations to the present disclosure. The network 100 may include any suitable number of network devices, terminal devices and/or serving cells adapted for implementing implementations of the present disclosure.

As used herein, the term 'terminal device' refers to any device having wireless or wired communication capabilities. Examples of the terminal device include, but not limited to, user equipment (UE), personal computers, desktops, mobile phones, cellular phones, smart phones, personal digital assistants (PDAs), portable computers, image capture devices such as digital cameras, gaming devices, music storage and playback appliances, or Internet appliances enabling wireless or wired Internet access and browsing and the like. For the purpose of discussion, in the following, some embodiments will be described with reference to UE as an example of the terminal device 220.

As used herein, the term 'network device' or 'base station' (BS) refers to a device which is capable of providing or hosting a cell or coverage where terminal devices can communicate. Examples of a network device include, but not limited to, a Node B (NodeB or NB), an Evolved NodeB (eNodeB or eNB), a next generation NodeB (gNB), a Remote Radio Unit (RRU), a radio head (RH), a remote radio head (RRH), a low power node such as a femto node, a pico node, and the like. For the purpose of discussion, in the following, some embodiments will be described with reference to gNB as examples of the network device 110.

In the communication network 100 as shown in FIG. 1A, the network device 110 can communicate data and control information to the terminal device 120 and the terminal device 120 can also communication data and control information to the network device 110. A link from the network device 110 to the terminal device 120 is referred to as a downlink (DL), while a link from the terminal device 120 to the network device 110 is referred to as an uplink (UL).

The communications in the network 100 may conform to any suitable standards including, but not limited to, Global System for Mobile Communications (GSM), Long Term Evolution (LTE), LTE-Evolution, LTE-Advanced (LTE-A), Wideband Code Division Multiple Access (WCDMA), Code Division Multiple Access (CDMA), GSM EDGE Radio Access Network (GERAN), Machine Type Communication (MTC) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols.

The network device 110 (such as, a gNB) may be equipped with one or more TRPs or antenna panels. As used herein, the term 'TRP' refers to an antenna array (with one or more antenna elements) available to the network device located at a specific geographical location. For example, a network device may be coupled with multiple TRPs in different geographical locations to achieve better coverage. The one or more TRPs may be included in a same serving cell or different serving cells.

It is to be understood that the TRP can also be a panel, and the panel can also refer to an antenna array (with one or more antenna elements) or a group of antennas. Although some embodiments of the present disclosure are described with reference to multiple TRPs for example, these embodiments are only for the purpose of illustration and help those skilled in the art to understand and implement the present disclosure, without suggesting any limitations as to the scope of the present disclosure. It is to be understood that the present disclosure described herein can be implemented in various manners other than the ones described below.

Figure 1B:
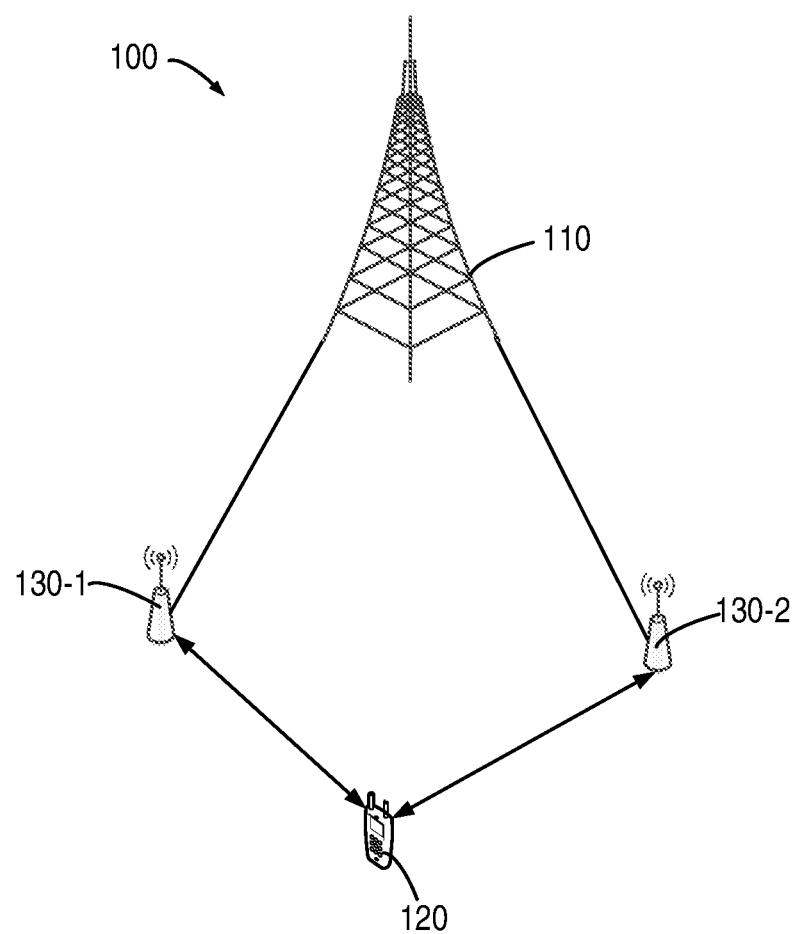

FIG. 1B shows an example scenario of the network 100 as shown in FIG. 1A. As shown in FIG. 1B, for example, the network device 110 may communicate with the terminal device 120 via the TRPs 130-1 and 130-2. In the following text, the TRP 130-1 may be also referred to as the first TRP, while the TRP 130-2 may be also referred to as the second TRP. The first and second TRPs 130-1 and 130-2 may be included in a same serving cell (such as, the cell 102 as shown in FIG. 1A) or different serving cells provided by the network device 110.

In the network 100, a demodulation reference signal (DMRS) may be a type of reference signals that provides modulation/demodulation information related to a communication channel (e.g., physical downlink control channel (PDCCH) and/or physical downlink shared channel (PDSCH)) for accurate or coherent decoding of information transmitted via the communication channel.

In transmission of DMRSs, the network device 110 may allocate corresponding resources (also referred to as 'DMRS resources') for the transmission and/or specify which DMRS sequence is to be transmitted. A set of DMRS resources associated with a number of DMRS ports may also be specified. A DMRS port may be referred to as a specific mapping of part or all of a DMRS sequence to one or more resource elements (REs) of a resource region allocated for RS transmission in time, frequency, and/or code domains. Such resource allocation information as well as other necessary information may be indicated to the terminal device 120 prior to the transmission of the DMRSs. For example, the DMRS configurations can be transmitted via higher layer signaling (such as Radio Resource Control (RRC) and/or Medium Access Control (MAC) Control Element (CE)) and/or dynamic signaling (such as downlink control information (DCI)) to the terminal device.

For example, in the network 100 as shown in FIG. 1B, the network device 110 may transmit DMRSs to the terminal device 120 via the first TRP 130-1 and the second TRP 130-2. For transmitting DMRSs to the terminal device 120 via multiple TRPs, the network device 110 may configure different groups of DMRS ports (also referred to as DMRS port groups or DMRS groups) for the first TRP 130-1 and the second TRP 130-2. As used herein, a DMRS group may refer to a group of DMRS ports for transmitting DMRSs. DMRS ports within one DMRS port group may be quasi co-located (QCLed) with each other. For example, a DMRS port group (also referred to as first DMRS port group or first DMRS group in the following) may be configured for the first TRP 130-1 and another DMRS port group (also referred to as second DMRS port group or second DMRS group in the following) may be configured for the second TRP 130-2. That is, the network device 110 may select, from the first DMRS port group configured for the first TRP 130-1, DMRS ports for transmitting DMRSs to the terminal device 120 via the first TRP 130-1, and may select, from the second DMRS port group for the second TRP 130-2, DMRS ports for transmitting DMRSs to the terminal device 120 via the second TRP 130-2.

In some embodiments, a quasi-co-location (QCL) type may be configured for Physical Downlink Shared Channel (PDSCH) and/or RSs. Examples of the RS may include but are not limited to downlink or uplink Demodulation Reference Signal (DMRS), CSI-RS, SRS, Phase Tracking Reference Signal (PTRS), Tracking Reference Signal (TRS), fine time-frequency Tracking Reference Signal (TRS), CSI-RS for tracking, Synchronization Signal (SS)/Physical Broadcast Channel (PBCH) block, SS block (SSB) and so on. For example, the QCL type may be at least one of the following: 'QCL-TypeA': {Doppler shift, Doppler spread, average delay, average spread}; 'QCL-TypeB': {Doppler shift, Doppler spread}; 'QCL-TypeC': {Doppler shift, average delay}; and 'QCL-TypeD': {Spatial Rx parameter}.

In some embodiments, a number of codewords may be configured to the terminal device 120. For example, the number may be 1 or 2. For example, the number of codewords may be configured by signaling in Radio Resource Control (RRC) and/or Medium Access Control (MAC) and/or Physical Layer (PHY).

In some embodiments, a set of parameters for DMRS transmission may be configured to the terminal device 120. The set of parameters may include at least one of the maximum number/length of the symbols for DMRS, a type of DMRS, and etc. For example, the set of parameters may be configured by signaling in Radio Resource Control (RRC) and/or Medium Access Control (MAC) and/or Physical Layer (PHY).

In some embodiments, the maximum number/length (for example, the maximum number/length is M) of symbols for DMRS may be the maximum number of symbols for each DMRS transmission occasion in one PDSCH transmission duration, and one DMRS transmission occasion may be the DMRS transmission in K consecutive symbols. For example, M may be 1, 2, 3 or 4. For example, K may be 1, 2, 3 or 4, and K is no greater than M. In some embodiments, the maximum number/length (for example, the maximum number/length is M) of symbols for DMRS may be the maximum number of symbols for the front-loaded DMRS, where the front-loaded DMRS is the first DMRS transmission occasion in K consecutive symbols in one PDSCH transmission duration. For example, M may be 1, 2, 3 or 4. For example, K may be 1, 2, 3 or 4, and K is no greater than M.

In some embodiments, the type of DMRS may be the DMRS configuration pattern in time and/or frequency domain. There are up to two types of DMRS that can be configured to the terminal device 120 (for example, DMRS type 1 and/or DMRS type 2). In some embodiments, DMRS type 1 can include up to 8 DMRS ports (for example, when the maximum number/length of DMRS is 2). The DMRS ports are multiplexed with at least one of FDM (frequency domain multiplexing), CDM (code domain multiplexing) in frequency domain and CDM in time domain. In some embodiments, DMRS type 1 can include up to 4 DMRS ports (for example, when the maximum number/length of DMRS is 1). The DMRS ports are multiplexed with at least one of FDM and CDM in frequency domain.

In some embodiments, DMRS type 2 can include up to 12 DMRS ports (for example, when the maximum number/length of DMRS is 2). The DMRS ports are multiplexed with at least one of FDM (frequency domain multiplexing), CDM (code domain multiplexing) in frequency domain and CDM in time domain. In some embodiments, DMRS type 2 can include up to 6 DMRS ports (for example, when the maximum number/length of DMRS is 1). The DMRS ports are multiplexed with at least one of FDM and CDM in frequency domain.

In some embodiments, if DMRS ports are multiplexed only with CDM in time and/or frequency domain, the DMRS ports are QCLed with each other with respect to {Doppler shift, Doppler spread, average delay, average spread, Spatial Rx parameter} and/or average gain. Alternatively, the DMRS ports are QCLed with each with respect to QCL-TypeA and QCL-TypeD and/or average gain.

In some embodiments, the DMRS ports within different DMRS groups can be multiplexed with FDM and/or Time Domain Multiplexing (TDM). In some embodiments, for DMRS type 1, the maximum 8 DMRS ports may be {0,1,2,3,4,5,6,7}. DMRS ports {0,1,4,5} are multiplexed with CDM in frequency domain and/or CDM in time domain, DMRS ports {0,1,4,5} should be QCLed with each other with respect to {Doppler shift, Doppler spread, average delay, average spread, Spatial Rx parameter} and/or average gain, and DMRS ports {0,1,4,5} should be within one DMRS group. DMRS ports {2,3,6,7} are multiplexed with CDM in frequency domain and/or CDM in time domain, DMRS ports {2,3,6,7} should be QCLed with each other with respect to {Doppler shift, Doppler spread, average delay, average spread, Spatial Rx parameter} and/or average gain, and DMRS ports {2,3,6,7} should be within one DMRS group.

In some embodiments, as an example of grouping of the DMRS ports, for DMRS type 1 as defined in 3GPP specifications, up to 2 DMRS groups (DMRS group G1 and/or DMRS group G2) may be configured. For example, if two DMRS groups are configured, DMRS group G1 may include at least one DMRS port from DMRS ports {0,1,4,5}, and DMRS group G2 may include at least one DMRS port from DMRS ports {2,3,6,7}. As another example, if only one DMRS group is configured, there is only one DMRS group G1 or DMRS group G2, and DMRS group G1 or DMRS group G2 may include at least one DMRS port from {0,1,2,3,4,5,6,7}.

In some embodiments, the DMRS ports within different DMRS groups can be multiplexed with FDM and/or TDM. In some embodiments, for DMRS type 2, the maximum 12 DMRS ports may be represented as DMRS ports {0,1,2,3,4,5,6,7,8,9,10,11}. DMRS ports {0,1,6,7} are multiplexed with CDM in frequency domain and/or CDM in time domain, DMRS ports {0,1,6,7} should be QCLed with each other with respect to {Doppler shift, Doppler spread, average delay, average spread, Spatial Rx parameter} and/or average gain, and DMRS ports {0,1,6,7} should be within one DMRS group. DMRS ports {2,3,8,9} are multiplexed with CDM in frequency domain and/or CDM in time domain, DMRS ports {2,3,8,9} should be QCLed with each other with respect to {Doppler shift, Doppler spread, average delay, average spread, Spatial Rx parameter} and/or average gain, and DMRS ports {2,3,8,9} should be within one DMRS group. DMRS ports {4,5,10,11} are multiplexed with CDM in frequency domain and/or CDM in time domain, DMRS ports {4,5,10,11} should be QCLed with each other with respect to {Doppler shift, Doppler spread, average delay, average spread, Spatial Rx parameter} and/or average gain, and DMRS ports {4,5,10,11} should be within one DMRS group.

In some embodiments, as an example of grouping of the DMRS ports, for DMRS type 2 as defined in 3GPP specifications, up to 2 DMRS groups (DMRS group G1 and/or DMRS group G2) may be configured. For example, if two DMRS groups are configured, DMRS group G1 may include at least one DMRS port from DMRS ports {0,1,6,7, 4,5,10,11}, and DMRS group G2 may include at least one DMRS port from DMRS ports {2,3,8,9}. As another example, if two DMRS groups are configured, DMRS group G1 may include at least one DMRS port from DMRS ports {0,1,6,7}, and DMRS group G2 may include at least one DMRS port from DMRS ports {2,3,8,9, 4,5,10,11}. As another example, if two DMRS groups are configured, DMRS group G1 may include at least one DMRS port from DMRS ports {0,1,6,7,2,3,8,9}, and DMRS group G2 may include at least one DMRS port from DMRS ports {4,5,10,11}. As another example, if only one DMRS group is configured, there is only one DMRS group G1 or DMRS group G2, and DMRS group G1 or DMRS group G2 may include at least one DMRS port from DMRS ports {0,1,2,3,4,5,6,7,8,9,10,11}.

In some embodiments, as an example of grouping of the DMRS ports, for DMRS type 2 as defined in 3GPP specifications, three DMRS groups (DMRS group G1, DMRS group G2, and DMRS group G3) may be configured. For example, if three DMRS groups are configured, DMRS group G1 may include at least one DMRS port from DMRS ports {0,1,6,7}, DMRS group G2 may include at least one DMRS port from DMRS ports {2,3,8,9}, and DMRS group G3 may include at least one DMRS port from DMRS ports {4,5,10,11}.

In some embodiments, for DMRS type 1 or DMRS type 2 as defined in 3GPP specifications, two DMRS groups (DMRS group G1 and/or DMRS group G2) are configured. In some embodiments, the DMRS ports from DMRS group G1 and the DMRS ports from DMRS group G2 may be QCLed with each other with respect to QCL-TypeB or with respect to {Doppler shift, Doppler spread}. In some embodiments, the DMRS ports from DMRS group G1 and the DMRS ports from DMRS group G2 may not be QCLed with each other with respect to any one of QCL-Type A, QCL-TypeB, QCL-TypeC and QCL-TypeD. In some embodiments, the DMRS ports from DMRS group G1 and the DMRS ports from DMRS group G2 may be QCLed with each other with respect to {Doppler shift, Doppler spread, average delay, average spread, Spatial Rx parameter} and/or average gain. Alternatively, the DMRS ports from DMRS group G1 and the DMRS ports from DMRS group G2 may be QCLed with each other with respect to QCL-Type A and QCL-TypeD.

In current specifications, there may be a TCI field in downlink control information (DCI). A terminal device may be configured with a TCI state, and the TCI state may indicate one RS set and parameters for configuring QCL relationship between one or two RSs within the RS set and the DMRS ports of the PDSCH. The terminal device may also be configured with a DMRS type, a maximum number/length of DMRS and/or the number of codewords. If the terminal device is configured with a given DMRS type, a given value of the maximum number/length of DMRS, and a given value of the number of codewords, there is one corresponding table for indication of at least one of antenna ports, the number of DMRS CDM group(s) without data, the number of front-loaded DMRS symbols, the number of DMRS port(s), and the index(es) for DMRS port(s).

As specified in the 3GPP specifications, if a UE is configured with the higher layer parameter tci-PresentInDCI that is set as 'enabled' for a control channel resource set (CORESET) scheduling the PDSCH, the UE assumes that the TCI field is present in the DCI format 1_1 of the PDCCH transmitted on the CORESET. If tci-PresentInDCI is not configured for the CORESET scheduling the PDSCH or the PDSCH is scheduled by a DCI format 1_0, for determining PDSCH antenna port quasi co-location, the UE assumes that the TCI state for the PDSCH is identical to the TCI state applied for the CORESET used for the PDCCH transmission.

If the tci-PresentInDCI is set as 'enabled', when the PDSCH is scheduled by DCI format 1_1, the UE shall use the TCI-State according to the value of the 'Transmission Configuration Indication' field in the detected PDCCH with DCI for determining PDSCH antenna port quasi co-location. The UE may assume that the DM-RS ports of PDSCH of a serving cell are quasi co-located with the RS(s) in the TCI state with respect to the QCL type parameter(s) given by the indicated TCI state if the time offset between the reception of the DL DCI and the corresponding PDSCH is equal to or greater than a threshold Threshold-Sched-Offset, where the threshold is based on reported UE capability.

In other words, in order to successfully receive DMRSs transmitted via the first TRP 130-1, the terminal device 120 needs to be informed of the selected DMRS ports for the TRP 130-1 and the TCI state for the first DMRS group. In order to successfully receive DMRSs transmitted via the second TRP 130-2, the terminal device 120 needs to be informed of the selected DMRS ports for the TRP 130-2 and the TCI state for the second DMRS group.

In general, the network device 110 may indicate the selected DMRS ports and the TCI state to the terminal device 120 in DCI, which may be carried by PDCCH, for example. More specifically, the PDCCH carries DCI to indicate the resource assignment in UL or DL for a terminal device, for example. A DCI can convey various pieces of information, but the useful content depends on the specific case of system deployment or operations. As indicated above, DCI format 1_1 includes a field for TCI (also referred to as first field in the following), which is 0 bit if higher layer parameter tci-PresentInDCI is not enabled and otherwise 3 bits. In addition, DCI format 1_1 includes a field for antenna port(s) (also referred to as second filed in the following) which is 4, 5, or 6 bits and which indicates the DMRS ports used by a network device. Table I-A as below shows an example of the field of antenna port(s) for DMRS type 1 and the maximum number/length of DMRS is 2. The number of bits for this field is 5 bits.

TABLE I-A

| Antenna port(s) (1000 + DMRS port), dmrs-Type = 1, maxLength = 2 ||||||| 
|---|---|---|---|---|---|---|
| One Codeword: Codeword 0 enabled, Codeword 1 disabled ||| Two Codewords: Codeword 0 enabled, Codeword 1 enabled |||
| Value | Number of DMRS CDM group(s) without data | DMRS port(s) | Number of front-load symbols | Value | Number of DMRS CDM group(s) without data | DMRS port(s) | Number of front-load symbols |
| 0 | 1 | 0 | 1 | 0 | 2 | 0-4 | 2 |
| 1 | 1 | 1 | 1 | 1 | 2 | 0, 1, 2, 3, 4, 6 | 2 |
| 2 | 1 | 0, 1 | 1 | 2 | 2 | 0, 1, 2, 3, 4, 5, 6 | 2 |
| 3 | 2 | 0 | 1 | 3 | 2 | 0, 1, 2, 3, 4, 5, 6, 7 | 2 |
| 4 | 2 | 1 | 1 | 4-31 | reserved | reserved | reserved |
| 5 | 2 | 2 | 1 | | | | |
| 6 | 2 | 3 | 1 | | | | |
| 7 | 2 | 0, 1 | 1 | | | | |
| 8 | 2 | 2, 3 | 1 | | | | |
| 9 | 2 | 0-2 | 1 | | | | |
| 10 | 2 | 0-3 | 1 | | | | |
| 11 | 2 | 0, 2 | 1 | | | | |
| 12 | 2 | 0 | 2 | | | | |
| 13 | 2 | 1 | 2 | | | | |
| 14 | 2 | 2 | 2 | | | | |
| 15 | 2 | 3 | 2 | | | | |
| 16 | 2 | 4 | 2 | | | | |
| 17 | 2 | 5 | 2 | | | | |
| 18 | 2 | 6 | 2 | | | | |
| 19 | 2 | 7 | 2 | | | | |
| 20 | 2 | 0, 1 | 2 | | | | |
| 21 | 2 | 2, 3 | 2 | | | | |
| 22 | 2 | 4, 5 | 2 | | | | |
| 23 | 2 | 6, 7 | 2 | | | | |
| 24 | 2 | 0, 4 | 2 | | | | |
| 25 | 2 | 2, 6 | 2 | | | | |
| 26 | 2 | 0, 1, 4 | 2 | | | | |
| 27 | 2 | 2, 3, 6 | 2 | | | | |
| 28 | 2 | 0, 1, 4, 5 | 2 | | | | |
| 29 | 2 | 2, 3, 6, 7 | 2 | | | | |
| 30 | 2 | 0, 2, 4, 6 | 2 | | | | |
| 31 | Reserved | Reserved | Reserved | | | | |

Table I-B as below shows an example of the field of antenna port(s) for DMRS type 1 and the maximum number/length of DMRS is 1. The number of bits for this field is 4 bits.

TABLE I-B

Antenna port(s) (1000 + DMRS port), dmrs-Type = 1, maxLength = 1
One Codeword: Codeword 0 enabled, Codeword 1 disabled

| Value | Number of DMRS CDM group(s) without data | DMRS port(s) |
|---|---|---|
| 0 | 1 | 0 |
| 1 | 1 | 1 |
| 2 | 1 | 0, 1 |
| 3 | 2 | 0 |
| 4 | 2 | 1 |
| 5 | 2 | 2 |
| 6 | 2 | 3 |
| 7 | 2 | 0, 1 |
| 8 | 2 | 2, 3 |
| 9 | 2 | 0-2 |
| 10 | 2 | 0-3 |
| 11 | 2 | 0, 2 |
| 12-15 | Reserved | Reserved |

Table I-C as below shows an example of the field of antenna port(s) for DMRS type 2 and the maximum number/length of DMRS is 1. The number of bits for this field is 5 bits.

TABLE I-C

Antenna port(s) (1000 + DMRS port), dmrs-Type = 2, maxLength = 1

| | One Codeword: Codeword 0 enabled, Codeword 1 disabled | | | Two Codewords: Codeword 0 enabled, Codeword 1 enabled | |
|---|---|---|---|---|---|
| Value | Number of DMRS CDM group(s) without data | DMRS port(s) | Value | Number of DMRS CDM group(s) without data | DMRS port(s) |
| 0 | 1 | 0 | 0 | 3 | 0-4 |
| 1 | 1 | 1 | 1 | 3 | 0-5 |
| 2 | 1 | 0, 1 | 2-31 | Reserved | Reserved |
| 3 | 2 | 0 | | | |
| 4 | 2 | 1 | | | |
| 5 | 2 | 2 | | | |
| 6 | 2 | 3 | | | |
| 7 | 2 | 0, 1 | | | |
| 8 | 2 | 2, 3 | | | |
| 9 | 2 | 0-2 | | | |
| 10 | 2 | 0-3 | | | |
| 11 | 3 | 0 | | | |
| 12 | 3 | 1 | | | |
| 13 | 3 | 2 | | | |
| 14 | 3 | 3 | | | |
| 15 | 3 | 4 | | | |
| 16 | 3 | 5 | | | |
| 17 | 3 | 0, 1 | | | |
| 18 | 3 | 2, 3 | | | |
| 19 | 3 | 4, 5 | | | |
| 20 | 3 | 0-2 | | | |
| 21 | 3 | 3-5 | | | |
| 22 | 3 | 0-3 | | | |
| 23 | 2 | 0, 2 | | | |
| 24-31 | Reserved | Reserved | | | |

Table I-D as below shows an example of the field of antenna port(s) for DMRS type 2 and the maximum number/length of DMRS is 2. The number of bits for this field is 6 bits.

TABLE I-D

Antenna port(s) (1000 + DMRS port), dmrs-Type = 2, maxLength = 2

| | One codeword: Codeword 0 enabled, Codeword 1 disabled | | | | Two Codewords: Codeword 0 enabled, Codeword 1 enabled | | |
|---|---|---|---|---|---|---|---|
| Value | Number of DMRS CDM group(s) without data | DMRS port(s) | Number of front-load symbols | Value | Number of DMRS CDM group(s) without data | DMRS port(s) | Number of front-load symbols |
| 0 | 1 | 0 | 1 | 0 | 3 | 0-4 | 1 |
| 1 | 1 | 1 | 1 | 1 | 3 | 0-5 | 1 |
| 2 | 1 | 0, 1 | 1 | 2 | 2 | 0, 1, 2, 3, 6 | 2 |
| 3 | 2 | 0 | 1 | 3 | 2 | 0, 1, 2, 3, 6, 8 | 2 |
| 4 | 2 | 1 | 1 | 4 | 2 | 0, 1, 2, 3, 6, 7, 8 | 2 |
| 5 | 2 | 2 | 1 | 5 | 2 | 0, 1, 2, 3, 6, 7, 8, 9 | 2 |
| 6 | 2 | 3 | 1 | 6-63 | Reserved | Reserved | Reserved |
| 7 | 2 | 0, 1 | 1 | | | | |
| 8 | 2 | 2, 3 | 1 | | | | |
| 9 | 2 | 0-2 | 1 | | | | |
| 10 | 2 | 0-3 | 1 | | | | |
| 11 | 3 | 0 | 1 | | | | |
| 12 | 3 | 1 | 1 | | | | |
| 13 | 3 | 2 | 1 | | | | |
| 14 | 3 | 3 | 1 | | | | |
| 15 | 3 | 4 | 1 | | | | |

TABLE I-D-continued

Antenna port(s) (1000 + DMRS port), dmrs-Type = 2, maxLength = 2

| | One codeword: Codeword 0 enabled, Codeword 1 disabled | | | | Two Codewords: Codeword 0 enabled, Codeword 1 enabled | | |
|---|---|---|---|---|---|---|---|
| Value | Number of DMRS CDM group(s) without data | DMRS port(s) | Number of front-load symbols | Value | Number of DMRS CDM group(s) without data | DMRS port(s) | Number of front-load symbols |
| 16 | 3 | 5 | 1 | | | | |
| 17 | 3 | 0, 1 | 1 | | | | |
| 18 | 3 | 2, 3 | 1 | | | | |
| 19 | 3 | 4, 5 | 1 | | | | |
| 20 | 3 | 0-2 | 1 | | | | |
| 21 | 3 | 3-5 | 1 | | | | |
| 22 | 3 | 0-3 | 1 | | | | |
| 23 | 2 | 0, 2 | 1 | | | | |
| 24 | 3 | 0 | 2 | | | | |
| 25 | 3 | 1 | 2 | | | | |
| 26 | 3 | 2 | 2 | | | | |
| 27 | 3 | 3 | 2 | | | | |
| 28 | 3 | 4 | 2 | | | | |
| 29 | 3 | 5 | 2 | | | | |
| 30 | 3 | 6 | 2 | | | | |
| 31 | 3 | 7 | 2 | | | | |
| 32 | 3 | 8 | 2 | | | | |
| 33 | 3 | 9 | 2 | | | | |
| 34 | 3 | 10 | 2 | | | | |
| 35 | 3 | 11 | 2 | | | | |
| 36 | 3 | 0, 1 | 2 | | | | |
| 37 | 3 | 2, 3 | 2 | | | | |
| 38 | 3 | 4, 5 | 2 | | | | |
| 39 | 3 | 6, 7 | 2 | | | | |
| 40 | 3 | 8, 9 | 2 | | | | |
| 41 | 3 | 10, 11 | 2 | | | | |
| 42 | 3 | 0, 1, 6 | 2 | | | | |
| 43 | 3 | 2, 3, 8 | 2 | | | | |
| 44 | 3 | 4, 5, 10 | 2 | | | | |
| 45 | 3 | 0, 1, 6, 7 | 2 | | | | |
| 46 | 3 | 2, 3, 8, 9 | 2 | | | | |
| 47 | 3 | 4, 5, 10, 11 | 2 | | | | |
| 48 | 1 | 0 | 2 | | | | |
| 49 | 1 | 1 | 2 | | | | |
| 50 | 1 | 6 | 2 | | | | |
| 51 | 1 | 7 | 2 | | | | |
| 52 | 1 | 0, 1 | 2 | | | | |
| 53 | 1 | 6, 7 | 2 | | | | |
| 54 | 2 | 0, 1 | 2 | | | | |
| 55 | 2 | 2, 3 | 2 | | | | |
| 56 | 2 | 6, 7 | 2 | | | | |
| 57 | 2 | 8, 9 | 2 | | | | |
| 58-63 | Reserved | Reserved | Reserved | | | | |

For example, as shown in Table 1-A, if the value of the field for antenna port(s) is 5, the selected DMRS port is DMRS port 2. If the value of the field for antenna port(s) is 10, the selected DMRS ports are DMRS ports 0-3. In addition, if the value of the field for antenna port(s) is 28, the selected DMRS ports are DMRS ports 0, 1, 4, and 5.

That is, a terminal device may determine the DMRS ports for receiving the DMRSs from the field for antenna port(s) in DCI transmitted from a network device, and may determine the TCI state from the field for TCI (3 bits, if present) in the DCI. In conventional solutions, there are only one TCI field with 3 bits and one DMRS indication field for antenna port(s). If multiple DMRS groups are introduced such as for multi-TRP transmission, more TCI fields may be needed. For example, in the network 100 as depicted in FIG. 1B, the network device 110 may need to indicate the selected DMRS ports for the TRP 130-1 and the TCI state for the first DMRS group as well as the selected DMRS ports for the TRP 130-2 and the TCI state for the second DMRS group to the terminal device 120. If more than two TRPs are supported, more than two TCI states for more than two DMRS groups need to be indicated, which will result large overhead for the indication.

In order to solve the above technical problems and potentially other technical problems in conventional solutions, embodiments of the present disclosure provide a solution for multi-TRP transmission. According to the solution, at least one TCI state can be indicated to the terminal device, which indicates a plurality of RS sets associated with multiple TRPs. Each of the plurality of RS sets includes one or more RSs QCLed with one or more DMRS ports within a corresponding DMRS group. The at least one TCI state is still indicated in the first filed for TCI in DCI and the selected DMRS ports for multiple TRPs are indicated in the second field for antenna port(s) in the DCI. The associations between the plurality of RS sets and the selected DMRS ports may be implicitly indicated by a combination of the first field and the second field of the DCI, or by an additional bit in the DCI or MAC layer signaling. In this way, the indication overhead for multi-TRP transmission can be reduced.

Figure 2:
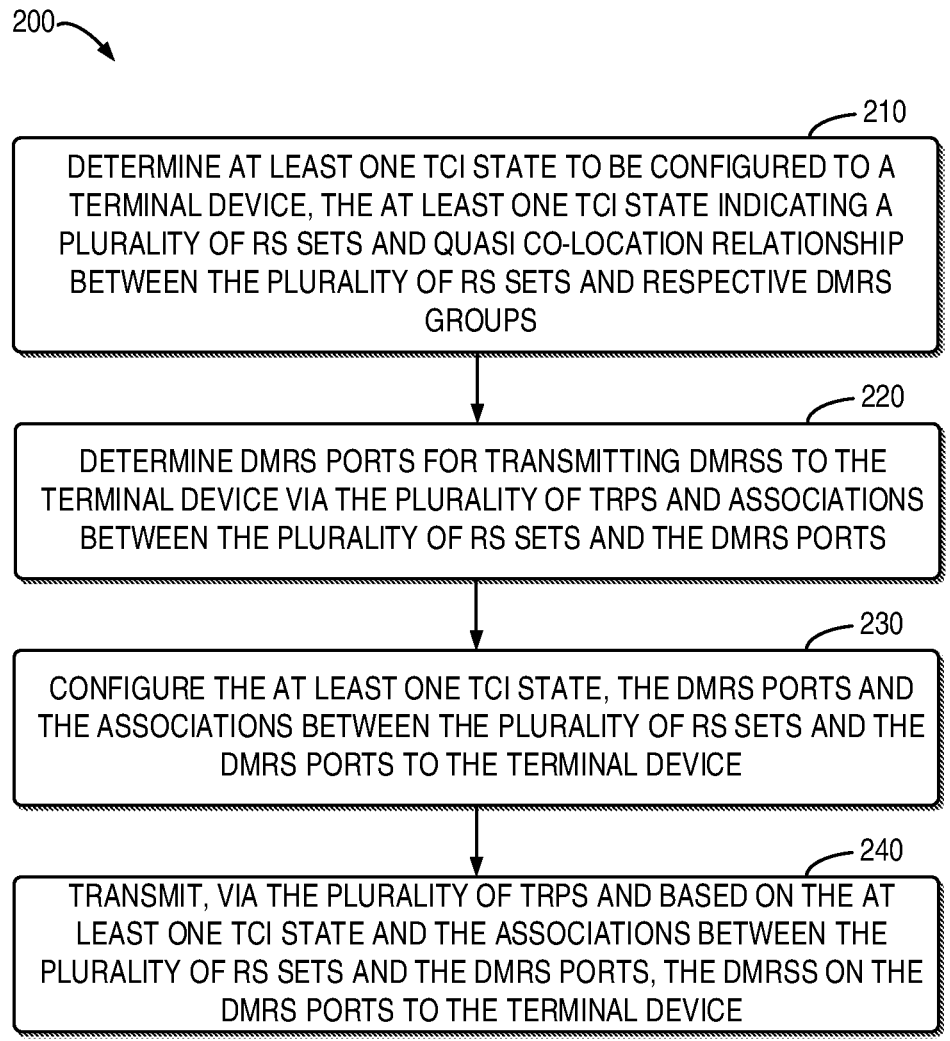
FIG. 2 shows a flowchart of an example method for multi-TRP transmission according to some embodiments of the present disclosure.

Principles and implementations of the present disclosure will be described in detail below with reference to FIG. 2, which shows a method 200 for multi-TRP transmission according to some embodiments of the present disclosure. For example, the method 200 can be implemented at the network device 110 as shown in FIGS. 1A-1B. It is to be understood that the method 200 may include additional blocks not shown and/or may omit some blocks as shown, and the scope of the present disclosure is not limited in this regard. For the purpose of discussion, the method 200 will be described from the perspective of the network device 110 with reference to FIGS. 1A-1B.

At block 210, the network device 110 determines at least one TCI state to be configured to the terminal device 120. In some embodiments, the at least one TCI state may indicate a plurality of RS sets and parameters for configuring QCL relationship between the plurality of RSs and respective DMRS groups. In some embodiments, the plurality of RS sets may be associated with a plurality of TRPs.

In some embodiments, the network device 120 may configure a plurality of TCI states to the terminal device 120 via RRC signaling. The network device 120 may select, from the plurality of TCI states configured via RRC signaling, the at least one TCI state.

Figure 3A:
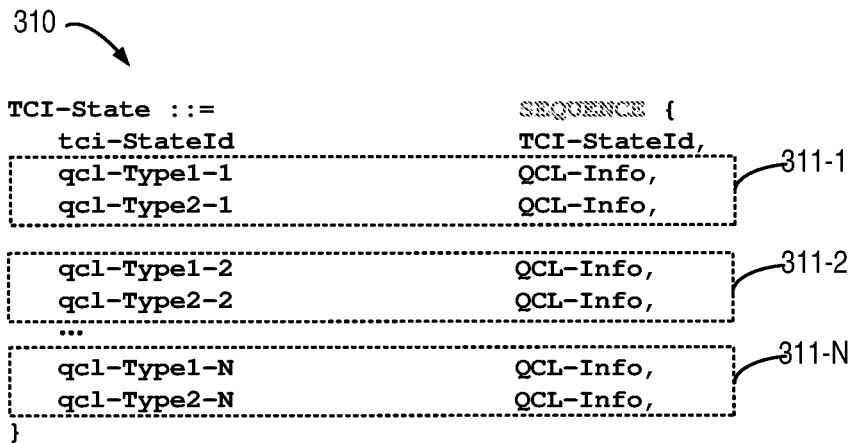
FIGS. 3A-3B show example information elements according to some embodiments of the present disclosure.

In some embodiments, each of the TCI states configured via RRC signaling may indicate a plurality of RS sets. FIG. 3A shows an information element defining a TCI state 310 in accordance with some embodiments of the present disclosure. As shown in FIG. 3A, the TCI state 310 indicates a plurality of groups of QCL information 311-1, 311-2 . . . 311-N (where N is an integer and N≥2). The QCL information 311-1 associates a first RS set including one or two DL RSs with respective QCL types, the QCL information 311-2 associates a second RS set including one or two DL RSs with respective QCL types, . . . and the QCL information 311-N associates a N-th RS set including one or two DL RSs with respective QCL types. In some embodiments, the plurality of RS sets may be associated with a plurality of TRPs. For example, the first RS set indicated by the QCL information 311-1 may be associated with the first TRP 130-1, and the second RS set indicated by the QCL information 311-2 may be associated with the second TRP 130-2. That is, in this case, one TCI state can indicate N RS sets, each of which includes one or two RSs QCLed with one or more DMRS ports within a corresponding DMRS group.

Figure 3B:
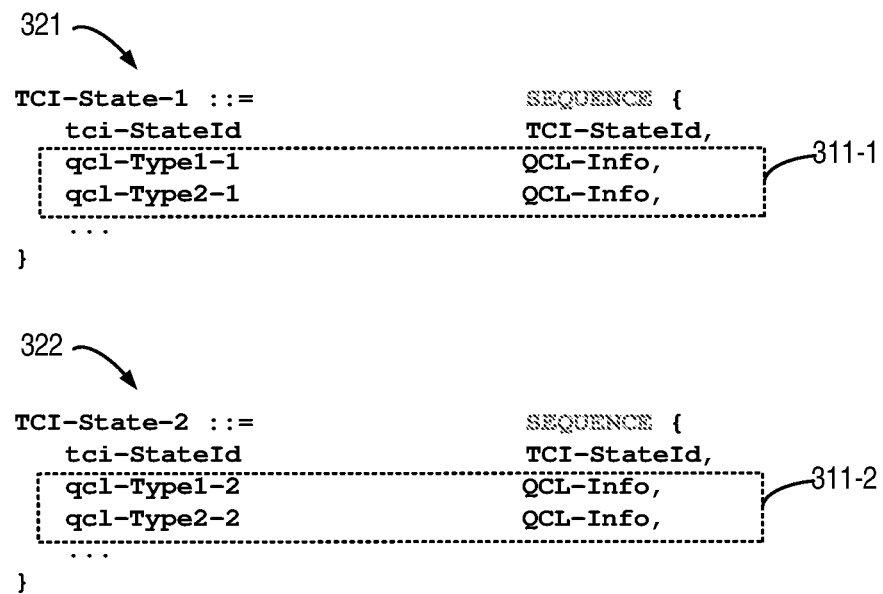

In some embodiments, each of the TCI states configured via RRC signaling may indicate only one RS set. For a given TCI state, there may be an additional TCI state paired with it or there may be at least one additional RS set in addition to the indicated RS set. FIG. 3B shows an example of such embodiments. FIG. 3B shows a pair of TCI states 321 and 322. For example, the TCI state 321 may be configured to the terminal device 120 via RRC signaling, which include the QCL information 311-1. The QCL information 311-1 associates a first RS set including one or two DL RSs with respective QCL types. The TCI state 322 may be paired with the TCI state 321, which include the QCL information 311-2. The QCL information 311-2 associates a second RS set including one or two DL RSs with respective QCL types. Although two TCI states paired with each other are shown in FIG. 3B, it is to be understood that this is merely for the purpose of illustration, without suggesting any limitation to the present disclosure. In other embodiments, there may be more than one TCI states paired with the TCI state 321 configured via RRC signaling.

In some embodiments, each of the TCI states configured via RRC signaling may indicate only one RS set. For a given TCI state, there may be an additional TCI state paired with it or there may be at least one additional RS set in addition to the indicated RS set. Alternatively, or in addition, in some embodiments, the additional TCI state and the given TCI state may share a same TCI state identifier (ID). That is, for a same TCI state ID, there may be two configurations. Each of the two configurations may indicate only one RS set, and the two RS sets in the two configurations may be different. In some embodiments, the additional TCI state or the additional RS set may be activated for the given TCI state via MAC layer signaling.

In some embodiments, up to M TCI state pairs may be activated via MAC Control Element (CE) and each TCI state pair may include one or two TCI states. In some embodiments, for example, M=8. In some embodiments, the network device 110 may select, from the activated TCI states pairs, one TCI state pair as the at least one TCI state to be configured to the terminal device 120.

Alternatively, or in addition, in some embodiments, up to M TCI states may be activated via MAC CE. For some of the activated TCI states, additional RS sets can be activated via MAC CE. That is, each of these TCI states may indicate at least two sets of RSs. In some embodiments, for example, M=8. In some embodiments, the network device 110 may select one of these TCI states indicating at least two RS sets as the at least one TCI state to be configured to the terminal device 120.

Alternatively, or in addition, in some embodiments, a first set of TCI states (for example, including up to M TCI states) may be activated via MAC CE. In addition, a second set of TCI states (for example, including N additional TCI states) may be activated via MAC CE, each of which may be paired with one of the first set of TCI states. In some embodiments, for example, M=8 and N≤8. In some embodiments, the network device 110 may select one TCI state from the first set of TCI states and the paired TCI state from the second set of TCI states as the at least one TCI state to be configured to the terminal device 120. In some embodiments, as will be further described in the following, in DCI, the first field for TCI and/or the second field for antenna port(s) can be used to indicate one TCI state from the first set of TCI states and the paired TCI state from the second set of TCI states.

Alternatively, or in addition, in some embodiments, up to M TCI states may be activated via MAC CE, each of which may indicate only one TCI state. In addition, N RS sets may be activated via MAC CE, each of which can be used as an additional RS set for one of the activated TCI states. In some embodiments, for example, M=8 and N≤8. In some embodiments, the network device 110 may select one TCI state from the activated TCI states indicating two RS sets as the at least one TCI state to be configured to the terminal device 120. In some embodiments, as will be further described in the following, in DCI, the first field for TCI and/or the second field for antenna port(s) can be used to indicate one TCI state from the activated TCI states and the additional RS set for the TCI state.

In some embodiments, each of the TCI states configured via RRC signaling may indicate only one RS set. For a given TCI state, there may be an additional TCI state paired with it or there may be at least one additional RS set in addition to the indicated RS set. In some embodiments, the additional TCI state or the additional RS set may be activated for the given TCI state via MAC layer signaling. In some embodiments, for the TCI state or RS set in RRC configuration, the RS may include but are not limited to DMRS, CSI-RS, SRS, PTRS, TRS, CSI-RS for tracking, SS/PBCH block, SSB and so on. Alternatively, or in addition, in some embodiments, for the additional TCI state or RS set activated by MAC CE, the RS may be only CSI-RS. Alternatively, or in addition, for the additional RS set activated by MAC CE, the RS may be only semi-persistent CSI-RS (SP-CSI-RS).

At block 220, the network device 110 determines DMRS ports for transmitting DMRSs to the terminal device 120 via the plurality of TRSs and associations between the plurality of RSs and the DMRS ports. At block 230, the network device 110 configures the at least one TCI state, the DMRS ports, and the associations between the plurality of RS sets and the DMRS ports to the terminal device 120.

In some embodiments, for example, the first DMRS port group may be configured for the first TRP 130-1 and the second DMRS port group may be configured for the second TRP 130-2. That is, the network device 110 may select, from the first DMRS port group, DMRS ports for transmitting DMRSs to the terminal device 120 via the first TRP 130-1, and may select, from the second DMRS port group, DMRS ports for transmitting DMRSs to the terminal device 120 via the second TRP 130-2.

In some embodiments, as described above, the at least one TCI state may indicate the plurality of RS sets, each of which includes one or two RSs QCLed with the DMRS ports within a corresponding DMRS group. For example, the plurality of RS sets may be associated with the plurality of TRPs. That is, in addition to determining the DMRS ports for transmitting DMRSs to the terminal device 120 via different TRPs, the network device 110 may also need to determine associations between the plurality of RS sets and respective DMRS groups and indicate the associations to the terminal device 120. In this way, the terminal device 120 can configure QCL relationship between one or two RSs within the RS set and the DMRS ports of the PDSCH. Only for the purpose of illustration, in the following description, it is assumed that the selected TCI state(s) indicates two RS sets associated with the TRPs 130-1 and 130-2. For example, the two RS sets may be represented as RS set A and RS set B.

Figure 4A:
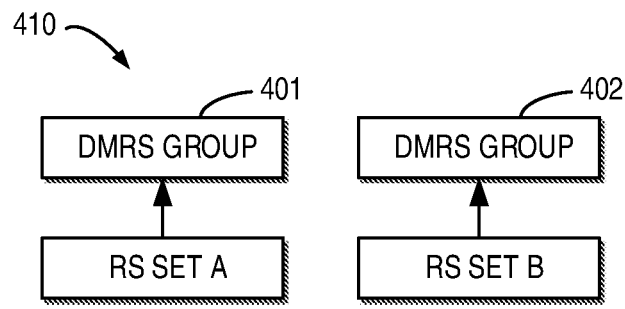
FIGS. 4A-4B show example association types according to some embodiments of the present disclosure.
Figure 4B:
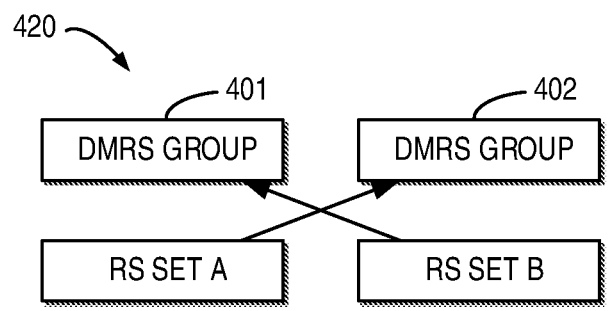

In some embodiments, an additional bit can be used to indicate the associations between the two RS sets in the selected TCI state(s) and two DMRS groups configured for the two TRPs 130-1 and 130-2. In some embodiments, the additional bit can be included in DCI or MAC CE transmitted from the network device 110 to the terminal device 120. FIGS. 4A and 4B show examples of such embodiments. FIG. 4A shows one type of associations 410 between the two RS sets in the selected TCI state(s) and two DMRS groups configured for the two TRPs 130-1 and 130-2. In FIGS. 4A and 4B, for example, it is assumed that a first DMRS group 401 is configured for the first TRP 130-1 and a second DMRS group 402 is configured for the second TRP 130-2. In the association type 410, the first DMRS group 401 configured for the TRP 130-1 is associated with RS set A, while the second DMRS group 402 configured for the TRP 130-2 is associated with RS set B. FIG. 4B shows another type of associations 420 between the two RS sets in the selected TCI state(s) and the DMRS groups 401 and 402 configured for the two TRPs 130-1 and 130-2. In the association type 420, the DMRS group 401 configured for the TRP 130-1 is associated with RS set B, while the DMRS group 402 configured for the TRP 130-2 is associated with RS set A. In some embodiments, if the value of the additional bit is '0', one of the association types 410 and 420 may be indicated; while if the value of the additional bit is '1', the other of the association types 410 and 420 may be indicated.

Alternatively, in some embodiments, no additional bit may be needed to indicate the associations between the two RS sets in the selected TCI state(s) and the DMRS ports. Instead, the associations can be implicitly indicated by the first field for TCI and/or the second field for antenna port(s) in DCI. In some embodiments, for example, if the selected TCI state(s) indicates RS set A and RS set B, and the determined DMRS port(s) include only one DMRS port or come from the same CDM group, then RS set A may be considered as being QCLed with the determined DMRS port(s).

In some embodiments, the terminal device 120 may be configured with a DMRS type, a maximum number/length of DMRS and/or the number of codewords. If the terminal device 120 is configured with a given DMRS type, a given value of the maximum number/length of DMRS, and a given value of the number of codewords, there is one corresponding table for indication of at least one of antenna ports, the number of DMRS CDM group(s) without data, the number of front-loaded DMRS symbols, the number of DMRS port(s), and the index(es) for DMRS port(s). In some embodiments, for multi-TRP transmission, some reserved value in the table can be used to indicate the associations between the two RS sets in the selected TCI state(s) and the DMRS ports.

In some embodiments, if two TCI states or one TCI state with two RS sets are configured for one PDSCH in one DCI, and if the indicated DMRS ports are from one DMRS port group, then only the first TCI state or the first RS set in the TCI state is assumed for the DMRS ports. In some embodiments, if two TCI states or one TCI state with two RS sets are configured for one PDSCH in one DCI, and if the indicated DMRS ports are multiplexed with CDM, then only the first TCI state or the first RS set in the TCI state is assumed for the DMRS ports.

In some embodiments, in case that the terminal device 120 is configured with a given DMRS type, a given value of the maximum number/length of DMRS, and only one codeword, some reserved value in the table for one codeword can be used to indicate the associations between the two RS sets in the selected TCI state(s) and the DMRS ports. For example, Table II-B-1 shows an example of such embodiments as below, in which DMRS type 1 is configured, the configured number of codeword is 1, and the configured maximum number/length of DMRS is 1. As compared with Table I-B in current specifications, the reserved value '12' in Table I-B is used to indicate DMRS ports 0-2 in Table II-B-1. That is, in Table II-B-1, the value '9' and the value '12' both indicate DMRS ports 0-2, corresponding to 3 spatial transmission layers. However, the value '9' and the value '12' in Table II-B-1 may be used to indicate different types of associations between the two RS sets in the selected TCI state(s) and the DMRS ports. In some embodiments, for example, if the selected TCI state(s) indicates RS set A and RS set B, the value '9' in Table II-B-1 may indicate that DMRS ports {0, 1} are associated with RS set A and the DMRS port {2} is associated with RS set B; while the value '12' in Table II-B-1 may indicate that DMRS ports {0, 1} are associated with RS set B and the DMRS port {2} is associated with RS set A. If RS set A is associated with the TRP 130-1 and RS set B is associated with the TRP 130-2, the value '9' in Table II-B-1 may indicate that two transmission layers are configured for the TRP 130-1 and one transmission layer is configured for the TRP 130-2, and the value '12' in Table II-B-1 may indicate that two transmission layers are configured for the TRP 130-2 and one transmission layer is configured for the TRP 130-1. It can be seen that, the number of bits for indicating one of the values in Table II-B-1 is still 5 bits, which is the same as Table I-B.

TABLE II-B-1

Antenna port(s) (1000 + DMRS port), dmrs-Type = 1, maxLength = 1
One Codeword: Codeword 0 enabled, Codeword 1 disabled

| Value | Number of DMRS CDM group(s) without data | DMRS port(s) |
|---|---|---|
| 0 | 1 | 0 |
| 1 | 1 | 1 |
| 2 | 1 | 0, 1 |
| 3 | 2 | 0 |
| 4 | 2 | 1 |
| 5 | 2 | 2 |
| 6 | 2 | 3 |
| 7 | 2 | 0, 1 |
| 8 | 2 | 2, 3 |
| 9 | 2 | 0-2 |
| 10 | 2 | 0-3 |
| 11 | 2 | 0, 2 |
| 12 | 2 | 0-2 |
| 13-15 | Reserved | Reserved |

In some embodiments, in case that the terminal device 120 is configured with a given DMRS type, a given value of the maximum number/length of DMRS, and only one codeword, the table can be extended to include some values for two codewords and these values for two codewords can be used to support multi-TRP transmission. In some embodiments, in case that two DMRS groups are configured for one PDSCH and the selected TCI state(s) indicates two RS sets, the total number of DMRS ports may not exceed 4 and an additional codeword can be used to support multi-TRP transmission.

Table II-B-2 shows an example of such embodiments as below, in which DMRS type 1 is configured and the configured maximum number/length of DMRS is 1. As compared with Table I-B in current specifications, Table II-B-2 includes some values for two codewords. In some embodiments, if the selected TCI state(s) indicates RS set A and RS set B, the DMRS ports indicated by these values for two codewords may be QCLed with both of RS set A and RS set B. As shown in Table II-B-2, the value '0' for two codewords may indicate DMRS ports {0, 2}, corresponding to 2 transmission layers; the value '1' for two codewords may indicate DMRS ports 0-2, corresponding to 3 transmission layers; the value '2' for two codewords may indicate DMRS ports 0-2, corresponding to 3 transmission layers; and the value '3' for two codewords may indicate DMRS ports 0-3, corresponding to 4 transmission layers. For example, the values for two codewords indicating 2, 3 or 4 transmission layers can be used for multi-TRP transmission.

As shown in Table II-B-2, if two codewords are configured, the value '1' and the value '2' both indicate DMRS ports 0-2, corresponding to 3 spatial transmission layers. However, the value '1' for two codewords and the value '2' for two codewords in Table II-B-2 may be used to indicate different types of associations between the two RS sets in the selected TCI state(s) and the DMRS ports. In some embodiments, for example, the value '1' for two codewords in Table II-B-2 may indicate that DMRS ports {0, 1} are associated with RS set A and the DMRS port {2} is associated with RS set B; while the value '2' for two codewords in Table II-B-2 may indicate that DMRS ports {0, 1} are associated with RS set B and the DMRS port {2} is associated with RS set A. If RS set A is associated with the TRP 130-1 and RS set B is associated with the TRP 130-2, the value '1' for two codewords in Table II-B-2 may indicate that two transmission layers are configured for the TRP 130-1 and one transmission layer is configured for the TRP 130-2, and the value '2' for two codewords in Table II-B-2 may indicate that two transmission layers are configured for the TRP 130-2 and one transmission layer is configured for the TRP 130-1. In some embodiments, only one of the value '1' and the value '2' may be present in the table. That is, there is only one value in the table to indication that the number of DMRS CDM group(s) without data is 2 and DMRS port(s) are 0-2. It can be seen that, the number of bits for indicating one of the values in Table II-B-2 is still 5 bits, which is the same as Table I-B.

TABLE II-B-2

Antenna port(s) (1000 + DMRS port), dmrs-Type = 1, maxLength = 1

| | One codeword: Codeword 0 enabled, Codeword 1 disabled | | | Two codewords: Codeword 0 enabled, Codeword 1 enabled | |
|---|---|---|---|---|---|
| Value | Number of DMRS CDM group(s) without data | DMRS port(s) | Value | Number of DMRS CDM group(s) without data | DMRS port(s) |
| 0 | 1 | 0 | 0 | 2 | 0, 2 |
| 1 | 1 | 1 | 1 | 2 | 0-2 |
| 2 | 1 | 0, 1 | 2 | 2 | 0-2 |
| 3 | 2 | 0 | 3 | 2 | 0-3 |
| 4 | 2 | 1 | 4-15 | Reserved | Reserved |
| 5 | 2 | 2 | | | |
| 6 | 2 | 3 | | | |
| 7 | 2 | 0, 1 | | | |
| 8 | 2 | 2, 3 | | | |
| 9 | 2 | 0-2 | | | |
| 10 | 2 | 0-3 | | | |
| 11 | 2 | 0, 2 | | | |
| 12-15 | Reserved | Reserved | | | |

Table II-B-3 shows another example of such embodiments as below, in which DMRS type 1 is configured and the configured maximum number/length of DMRS is 1. In Table II-B-3, if the selected TCI state(s) indicates RS set A and RS set B and only one codeword is configured, any of the values '0' to '11' may implicitly indicate that the corresponding DMRS port(s) are QCLed with RS set A. If the selected TCI state(s) indicates RS set A and RS set B and two codewords are configured, any of the values '4' to '15' may implicitly indicate that only one codeword is actually used for DMRS transmission and the corresponding DMRS port(s) are QCLed with RS set B. In addition, if the selected TCI state(s) indicates RS set A and RS set B and two codewords are configured, any of the values '0' to '3' may implicitly indicate that two codeword are actually used for DMRS transmission and the corresponding DMRS port(s) are QCLed with both of RS set A and RS set B. As shown in Table II-B-3, the value '0' for two codewords may indicate DMRS ports {0, 2}, corresponding to 2 transmission layers; the value '1' for two codewords may indicate DMRS ports 0-2, corresponding to 3 transmission layers; the value '2' for two codewords may indicate DMRS ports 0-2, corresponding to 3 transmission layers; and the value '3' for two codewords may indicate DMRS ports 0-3, corresponding to 4 transmission layers. For example, the values for two codewords indicating 2, 3 or 4 transmission layers can be used for multi-TRP transmission.

As shown in Table II-B-3, if two codewords are configured, the value '1' and the value '2' both indicate DMRS ports 0-2, corresponding to 3 spatial transmission layers. However, the value '1' for two codewords and the value '2' for two codewords in Table II-B-3 may be used to indicate different types of associations between the two RS sets in the selected TCI state(s) and the DMRS ports. In some embodiments, for example, the value '1' for two codewords in Table II-B-3 may indicate that DMRS ports {0, 1} are associated with RS set A and the DMRS port {2} is associated with RS set B; while the value '2' for two codewords in Table II-B-3 may indicate that DMRS ports {0, 1} are associated with RS set B and the DMRS port {2} is associated with RS set A. If RS set A is associated with the TRP 130-1 and RS set B is associated with the TRP 130-2, the value '1' for two codewords in Table II-B-3 may indicate that two transmission layers are configured for the TRP 130-1 and one transmission layer is configured for the TRP 130-2, and the value '2' for two codewords in Table II-B-3 may indicate that two transmission layers are configured for the TRP 130-2 and one transmission layer is configured for the TRP 130-1. It can be seen that, the number of bits for indicating one of the values in Table II-B-3 is still 5 bits, which is the same as Table I-B.

TABLE II-B-3

Antenna port(s) (1000 + DMRS port), dmrs-Type = 1, maxLength = 1

| | One codeword:<br>Codeword 0 enabled,<br>Codeword 1 disabled | | | Two codewords:<br>Codeword 0 enabled,<br>Codeword 1 enabled | |
| --- | --- | --- | --- | --- | --- |
| Value | Number of DMRS CDM group(s) without data | DMRS port(s) | Value | Number of DMRS CDM group(s) without data | DMRS port(s) |
| 0 | 1 | 0 | 0 | 2 | 0, 2 |
| 1 | 1 | 1 | 1 | 2 | 0-2 |
| 2 | 1 | 0, 1 | 2 | 2 | 0-2 |
| 3 | 2 | 0 | 3 | 2 | 0-3 |
| 4 | 2 | 1 | 4 | 1 | 0 |
| 5 | 2 | 2 | 5 | 1 | 1 |
| 6 | 2 | 3 | 6 | 1 | 0, 1 |
| 7 | 2 | 0, 1 | 7 | 2 | 0 |
| 8 | 2 | 2, 3 | 8 | 2 | 1 |
| 9 | 2 | 0-2 | 9 | 2 | 2 |
| 10 | 2 | 0-3 | 10 | 2 | 3 |
| 11 | 2 | 0, 2 | 11 | 2 | 0, 1 |
| 12-15 | Reserved | Reserved | 12 | 2 | 2, 3 |
| | | | 13 | 2 | 0-2 |
| | | | 14 | 2 | 0-3 |
| | | | 15 | 2 | 0, 2 |

Table II-B-4 shows another example of such embodiments as below, in which DMRS type 1 is configured and the configured maximum number/length of DMRS is 2. In some embodiments, if the selected TCI state(s) indicates RS set A and RS set B, the DMRS ports indicated by these values for two codewords may be QCLed with both of RS set A and RS set B. As shown in Table II-B-4, the value '4' for two codewords may indicate DMRS ports {0, 2}, and the number of front-loaded DMRS symbols is 1, corresponding to 2 transmission layers; the value '5' for two codewords may indicate DMRS ports {0, 1, 2}, and the number of front-loaded DMRS symbols is 1, corresponding to 3 transmission layers; the value '6' for two codewords may indicate DMRS ports {0, 1, 2, 3}, and the number of front-loaded DMRS symbols is 1, corresponding to 4 transmission layers; the value '7' for two codewords may indicate DMRS ports {0, 2}, and the number of front-loaded DMRS symbols is 2, corresponding to 2 transmission layers; the value '8' for two codewords may indicate DMRS ports {0, 1, 2}, and the number of front-loaded DMRS symbols is 2, corresponding to 3 transmission layers; and the value '9' for two codewords may indicate DMRS ports {0, 1, 2, 3}, and the number of front-loaded DMRS symbols is 2, corresponding to 4 transmission layers. In some embodiments, the value '10' for two codewords may indicate DMRS ports {0, 1, 2}, and the number of front-loaded DMRS symbols is 1, corresponding to 3 transmission layers; and the value '11' for two codewords may indicate DMRS ports {0, 1, 2}, and the number of front-loaded DMRS symbols is 2, corresponding to 3 transmission layers. For example, the values for two codewords indicating 2, 3 or 4 transmission layers can be used for multi-TRP transmission.

As shown in Table II-B-4, if two codewords are configured, the values '5', '8', '10' and '11' all indicate DMRS ports 0-2, corresponding to 3 spatial transmission layers. However, the value '5' for two codewords and the value '10' for two codewords in Table II-B-4 may be used to indicate different types of associations between the two RS sets in the selected TCI state(s) and the DMRS ports. In addition, the value '8' for two codewords and the value '11' for two codewords in Table II-B-4 may be used to indicate different types of associations between the two RS sets in the selected TCI state(s) and the DMRS ports. In some embodiments, for example, the value '10' and/or value '11' for two codewords in Table II-B-4 may indicate that DMRS ports {0, 1} are associated with RS set A and the DMRS port {2} is associated with RS set B; while the value '5' and/or value '8' for two codewords in Table II-B-4 may indicate that DMRS ports {0, 1} are associated with RS set B and the DMRS port {2} is associated with RS set A. If RS set A is associated with the TRP 130-1 and RS set B is associated with the TRP 130-2, the value '10' and/or '11' for two codewords in Table II-B-4 may indicate that two transmission layers are configured for the TRP 130-1 and one transmission layer is configured for the TRP 130-2, and the value '5' and/or '8' for two codewords in Table II-B-4 may indicate that two transmission layers are configured for the TRP 130-2 and one transmission layer is configured for the TRP 130-1. In some embodiments, the value of '10' may be reserved in the table. That is, there is only one value in the table to indicate that the number of DMRS CDM group(s) without data is 2, the selected DMRS ports are DMRS ports 0-2 and the number of front-loaded DMRS symbols is 1. In some embodiments, the value of '11' may be reserved in the table. That is, there is only one value in the table to indication that the number of DMRS CDM group(s) without data is 2, the selected DMRS ports are DMRS ports 0-2 and the number of front-loaded DMRS symbols is 2. It can be seen that, the number of bits for indicating one of the values in Table II-B-4 is still 5 bits.

TABLE II-B-4

Antenna port(s) (1000 + DMRS port), dmrs-Type = 1, maxLength = 2
Two Codewords: Codeword 0 enabled, Codeword 1 enabled

| Value | Number of DMRS CDM group(s) without data | DMRS port(s) | Number of front-load symbols |
| --- | --- | --- | --- |
| 0 | 2 | 0-4 | 2 |
| 1 | 2 | 0, 1, 2, 3, 4, 6 | 2 |

TABLE II-B-4-continued

Antenna port(s) (1000 + DMRS port), dmrs-Type = 1, maxLength = 2
Two Codewords: Codeword 0 enabled, Codeword 1 enabled

| Value | Number of DMRS CDM group(s) without data | DMRS port(s) | Number of front-load symbols |
|---|---|---|---|
| 2 | 2 | 0, 1, 2, 3, 4, 5, 6 | 2 |
| 3 | 2 | 0, 1, 2, 3, 4, 5, 6, 7 | 2 |
| 4 | 2 | 0, 2 | 1 |
| 5 | 2 | 0-2 | 1 |
| 6 | 2 | 0-3 | 1 |
| 7 | 2 | 0, 2 | 2 |
| 8 | 2 | 0-2 | 2 |
| 9 | 2 | 0-3 | 2 |
| 10 | 2 | 0-2 | 1 |
| 11 | 2 | 0-2 | 2 |
| 12-31 | Reserved | Reserved | Reserved |

Table II-B-5 shows another example of such embodiments as below, in which DMRS type 2 is configured and the configured maximum number/length of DMRS is 1. In some embodiments, if the selected TCI state(s) indicates RS set A and RS set B, the DMRS ports indicated by these values for two codewords may be QCLed with both of RS set A and RS set B. As shown in Table II-B-4, the value '2' for two codewords may indicate DMRS ports {0, 2}, corresponding to 2 transmission layers; the value '3' for two codewords may indicate DMRS ports {0, 1, 2}, corresponding to 3 transmission layers; the value '4' for two codewords may indicate DMRS ports {0, 1, 2, 3}, corresponding to 4 transmission layers; and the value '5' for two codewords may indicate DMRS ports {0, 1, 2}, corresponding to 3 transmission layers. For example, the values for two codewords indicating 2, 3 or 4 transmission layers can be used for multi-TRP transmission.

As shown in Table II-B-5, if two codewords are configured, the value '3' and the value '5' both indicate DMRS ports 0-2, corresponding to 3 spatial transmission layers. However, the value '3' for two codewords and the value '5' for two codewords in Table II-B-5 may be used to indicate different types of associations between the two RS sets in the selected TCI state(s) and the DMRS ports. In some embodiments, for example, the value '5' for two codewords in Table II-B-5 may indicate that DMRS ports {0, 1} are associated with RS set A and the DMRS port {2} is associated with RS set B; while the value '3' for two codewords in Table II-B-5 may indicate that DMRS ports {0, 1} are associated with RS set B and the DMRS port {2} is associated with RS set A. If RS set A is associated with the TRP 130-1 and RS set B is associated with the TRP 130-2, the value '5' for two codewords in Table II-B-5 may indicate that two transmission layers are configured for the TRP 130-1 and one transmission layer is configured for the TRP 130-2, and the value '3' for two codewords in Table II-B-5 may indicate that two transmission layers are configured for the TRP 130-2 and one transmission layer is configured for the TRP 130-1. In some embodiments, the value of '5' may be reserved in the table. That is, there is only one value in the table to indicate that the number of DMRS CDM group(s) without data is 2 or 3 and the selected DMRS ports are DMRS ports 0-2.

TABLE II-B-5

Antenna port(s) (1000 + DMRS port), dmrs-Type = 2, maxLength = 1
Two codewords: Codeword 0 enabled, Codeword 1 enabled

| Value | Number of DMRS CDM group(s) without data | DMRS port(s) |
|---|---|---|
| 0 | 3 | 0-4 |
| 1 | 3 | 0-5 |
| 2 | 2 or 3 | 0, 2 |
| 3 | 2 or 3 | 0-2 |
| 4 | 2 or 3 | 0-3 |
| 5 | 2 or 3 | 0, 2 |
| 6-31 | Reserved | Reserved |

Table II-B-6 shows another example of such embodiments as below, in which DMRS type 2 is configured and the configured maximum number/length of DMRS is 2. In some embodiments, if the selected TCI state(s) indicates RS set A and RS set B, the DMRS ports indicated by these values for two codewords may be QCLed with both of RS set A and RS set B. As shown in Table II-B-6, the value '6' for two codewords may indicate DMRS ports {0, 2}, and the number of front-loaded DMRS symbols is 1, corresponding to 2 transmission layers; the value '7' for two codewords may indicate DMRS ports {0, 1, 2}, and the number of front-loaded DMRS symbols is 1, corresponding to 3 transmission layers; the value '8' for two codewords may indicate DMRS ports {0, 1, 2, 3}, and the number of front-loaded DMRS symbols is 1, corresponding to 4 transmission layers; the value '9' for two codewords may indicate DMRS ports {0, 2}, and the number of front-loaded DMRS symbols is 2, corresponding to 2 transmission layers; the value '10' for two codewords may indicate DMRS ports {0, 1, 2}, and the number of front-loaded DMRS symbols is 2, corresponding to 3 transmission layers; the value '11' for two codewords may indicate DMRS ports {0, 1, 2, 3}, and the number of front-loaded DMRS symbols is 2, corresponding to 4 transmission layers; In some embodiments, the value '12' for two codewords may indicate DMRS ports {0, 1, 2}, and the number of front-loaded DMRS symbols is 1, corresponding to 3 transmission layers; and the value '13' for two codewords may indicate DMRS ports {0, 1, 2}, and the number of front-loaded DMRS symbols is 2, corresponding to 3 transmission layers. For example, the values for two codewords indicating 2, 3 or 4 transmission layers can be used for multi-TRP transmission.

As shown in Table II-B-6, if two codewords are configured, the values '7', '10', '12' and '13' all indicate DMRS ports 0-2, corresponding to 3 spatial transmission layers. However, the value '7' for two codewords and the value '12' for two codewords in Table II-B-6 may be used to indicate different types of associations between the two RS sets in the selected TCI state(s) and the DMRS ports, and the value '10' for two codewords and the value '13' for two codewords in Table II-B-6 may be used to indicate different types of associations between the two RS sets in the selected TCI state(s) and the DMRS ports. In some embodiments, for example, the value '12' and/or '13' for two codewords in Table II-B-6 may indicate that DMRS ports {0, 1} are associated with RS set A and the DMRS port {2} is associated with RS set B; while the value '7' and/or '10' for two codewords in Table II-B-6 may indicate that DMRS ports {0, 1} are associated with RS set B and the DMRS port {2} is associated with RS set A. If RS set A is associated with the TRP 130-1 and RS set B is associated with the TRP 130-2, the value '12' and/or '13' for two codewords in Table II-B-6 may indicate that two transmission layers are configured for the TRP 130-1 and one transmission layer is configured for the TRP 130-2, and the value '7' and/or '10' for two codewords in Table II-B-6 may indicate that two transmission layers are configured for the TRP 130-2 and one transmission layer is configured for the TRP 130-1. In some embodiments, the value of '12' may be reserved in the table. That is, there is only one value in the table to indicate that the number of DMRS CDM group(s) without data is 2 or 3, the selected DMRS ports are DMRS ports 0-2 and the number of front-loaded DMRS symbols is 1. In some embodiments, the value of '13' may be reserved in the table. That is, there is only one value in the table to indicate that the number of DMRS CDM group(s) without data is 2 or 3, the selected DMRS ports are DMRS ports 0-2 and the number of front-loaded DMRS symbols is 2.

TABLE II-B-6

Antenna port(s) (1000 + DMRS port), dmrs-Type = 2, maxLength = 2
Two Codewords: Codeword 0 enabled, Codeword 1 enabled

| Value | Number of DMRS CDM group(s) without data | DMRS port(s) | Number of front-load symbols |
|---|---|---|---|
| 0 | 3 | 0-4 | 1 |
| 1 | 3 | 0-5 | 1 |
| 2 | 2 | 0, 1, 2, 3, 6 | 2 |
| 3 | 2 | 0, 1, 2, 3, 6, 8 | 2 |
| 4 | 2 | 0, 1, 2, 3, 6, 7, 8 | 2 |
| 5 | 2 | 0, 1, 2, 3, 6, 7, 8, 9 | 2 |
| 6 | 2 or 3 | 0, 2 | 1 |
| 7 | 2 or 3 | 0-2 | 1 |
| 8 | 2 or 3 | 0-3 | 1 |
| 9 | 2 or 3 | 0, 2 | 2 |
| 10 | 2 or 3 | 0-2 | 2 |
| 11 | 2 or 3 | 0-3 | 2 |
| 12 | 2 or 3 | 0-2 | 1 |
| 13 | 2 or 3 | 0-2 | 2 |
| 14-63 | Reserved | Reserved | Reserved |

In some embodiments, if only two codewords are supported for multi-TRP transmission, there may be different values for two codewords in the table to indicate a same number of DMRS CDM groups without data, same DMRS ports and a same number of front-loaded symbols. These different values can be used to indicate additional TCI states or additional RS sets activated by MAC CE. For example, Table III shows an example of such embodiments as below. In Table III, the values 'a' to 'a+N' all indicate the same number of DMRS CDM groups without data x (where x may equal to 2 or 3), the same number of front-loaded symbols L (where L may equal to 1 or 2) and same DMRS ports P (for example, corresponding to K transmission layers), but different additional TCI states or additional RS sets for QCL.

TABLE III

Two codewords: Codeword 0 enabled, Codeword 1 enabled

| Value | Number of DMRS CDM group(s) without data | DMRS port(s) | Number of front-load symbols | Additional TCI state or RS set |
|---|---|---|---|---|
| a | x | P | L | T_1 |
| a + 1 | x | P | L | T_2 |
| a + 2 | x | P | L | T_3 |
| ... | ... | ... | ... | ... |
| a + N | x | P | L | T_N |
| ... | ... | ... | ... | ... |

At block 240, the network device 110 transmits, via the plurality of TRPs and based on the at least one TCI state and the associations between the plurality of RS sets and the DMRS ports, the DMRSs on the DMRS ports to the terminal device 120. In this way, multi-TRP transmission can be supported without introducing additional indication overhead.

Figure 5:
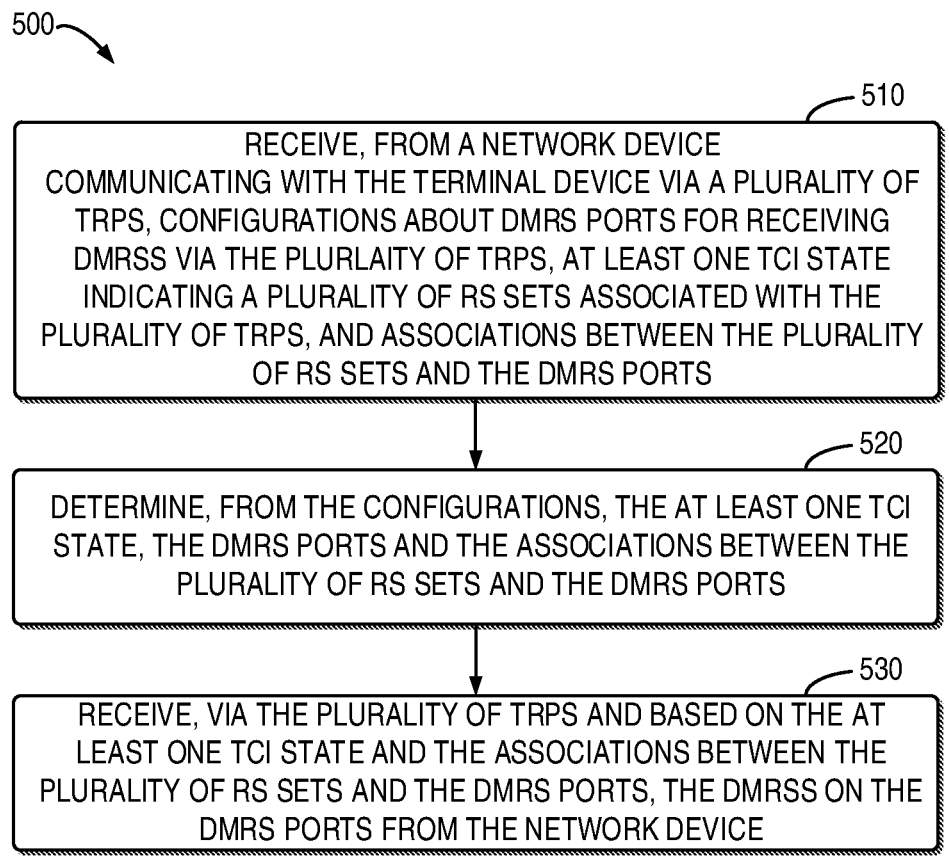
FIG. 5 shows a flowchart of an example method for multi-TRP transmission according to some embodiments of the present disclosure.

FIG. 5 shows a flowchart of an example method 500 in accordance with some embodiments of the present disclosure. The method 500 can be implemented at the terminal device 120 as shown in FIGS. 1A and 1B. It is to be understood that the method 500 may include additional blocks not shown and/or may omit some blocks as shown, and the scope of the present disclosure is not limited in this regard. For the purpose of discussion, the method 500 will be described from the perspective of terminal device 120 with reference to FIGS. 1A and 1B.

At 510, the terminal device 120 receives configurations from the network device 110 communicating with the terminal device 120 via a plurality of TRPs 130-1 and 130-2.

At block 520, the terminal device 120 determines, from the configurations, DMRS ports for receiving DMRSs via the plurality of TRPs 130-1 and 130-2, at least one TCI state indicating a plurality of RS sets associated with the plurality of TRPs, and associations between the plurality of RS sets and the DMRS ports.

In some embodiments, the terminal device 120 may be configured with a plurality of TCI states by the network device 110. In some embodiments, the at least one TCI state may be selected from the plurality of TCI states by the network device 110.

In some embodiments, the plurality of TCI states configured by the network device 110 may include a first TCI state indicating a first RS set and a second RS set. In some embodiments, the terminal device 120 may be configured, by the network device 110, with the first TCI state indicating the first RS set via first signaling. In addition, the terminal device 120 may be configured, by the network device 110, with the second RS set for the first TCI state via second signaling.

In some embodiments, the plurality of TCI states configured by the network device 110 may include a pair of TCI states indicating a first RS set and a second RS set. In some embodiments, the terminal device 120 may be configured, by the network device 110, with one of the pair of TCI states indicating the first RS set via first signaling. In addition, the terminal device 120 may be configured, by the network device 110, with the other of the pair of TCI states indicating the second RS set via second signaling.

In some embodiments, the first signaling is RRC signaling, and the second signaling is MAC layer signaling.

In some embodiments, the terminal device 120 may be configured, by the network device 110, with the at least one TCI state, the DMRS ports, and the associations between the plurality of RS sets and the DMRS ports via DCI. The terminal device 120 may determine, from the DCI, the at least one TCI state, the DMRS ports, and the associations between the plurality of RS sets and the DMRS ports.

In some embodiments, the terminal device 120 may determine the at least one TCI state from a first field of the DCI. The terminal device 120 may determine the DMRS ports from a second field of the DCI. The terminal device 120 may determine the associations between the plurality of RS sets and the DMRS ports from a combination of the first field and the second field.

In some embodiments, the terminal device 120 may determine the at least one TCI state from a first field of the DCI. The terminal device 120 may determine the DMRS ports from a second field of the DCI. The terminal device 120 may determine the associations between the plurality of RS sets and the DMRS ports from a third field of the DCI.

In some embodiments, the terminal device 120 may be configured, by the network device 110, with the at least one TCI state and the DMRS ports via DCI. In some embodiments, the terminal device 120 may determine the at least one TCI state from a first field of the DCI. The terminal device 120 may determine the DMRS ports from a second field of the DCI. In some embodiments, the terminal device 120 may be configured, by the network device 110, with the associations between the plurality of RS sets and the DMRS ports via MAC layer signaling.

It is to be understood that if a given DMRS type, a given value of the maximum number/length of DMRS, and a given value of the number of codewords are configured to the terminal device 120, the terminal device 120 may determine one corresponding table for indication of at least one of antenna ports, the number of DMRS CDM group(s) without data, the number of front-loaded DMRS symbols, the number of DMRS port(s), and the index(es) for DMRS port(s). For example, these tables may be configured at both of the network device 110 and the terminal device 120. The terminal device 120 may determine the at least one TCI state, the DMRS ports, and the associations between the plurality of RS sets and the DMRS ports based on corresponding tables in a reverse way as described above with respect to the network device 110. For the purpose of simplification, the determining of the at least one TCI state, the DMRS ports, and the associations between the plurality of RS sets and the DMRS ports by the terminal device 120 will not be further described in detail.

At block 530, the terminal device 120 receives, via the plurality of TRPs 130-1 and 130-2 and based on the at least one TCI state and the associations between the plurality of RS sets and the DMRS ports, the DMRSs on the DMRS ports from the network device 110.

It can be seen that, according to embodiments of the present disclosure, at least one TCI state can be indicated to the terminal device, which indicates a plurality of RS sets associated with multiple TRPs. Each of the plurality of RS sets includes one or more RSs QCLed with one or more DMRS ports within a corresponding DMRS group. The at least one TCI state is still indicated in the first filed for TCI in DCI and the selected DMRS ports for multiple TRPs are indicated in the second field for antenna port(s) in the DCI. The associations between the plurality of RS sets and the selected DMRS ports may be implicitly indicated by a combination of the first field and the second field of the DCI, or by an additional bit in the DCI or MAC layer signaling. In this way, the indication overhead for multi-TRP transmission can be reduced.

Figure 6:
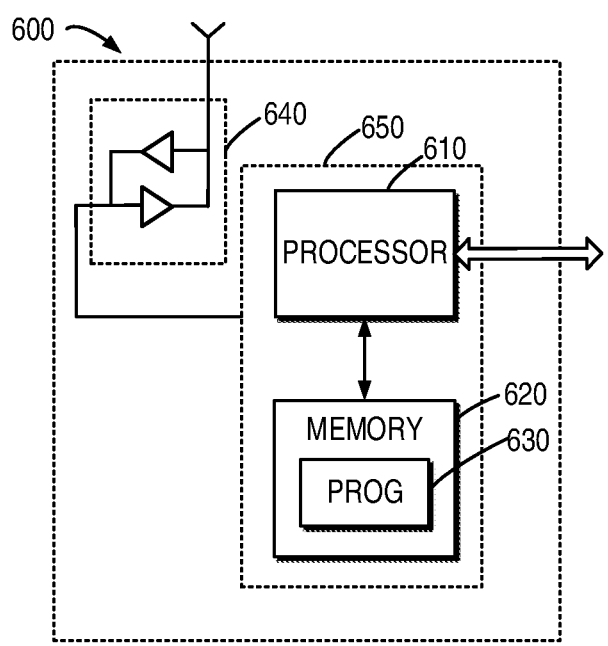
FIG. 6 shows a simplified block diagram of a device that is suitable for implementing embodiments of the present disclosure.

FIG. 6 is a simplified block diagram of a device 600 that is suitable for implementing embodiments of the present disclosure. The device 600 can be considered as a further example implementation of the network device 110 or the terminal device 120 as shown in FIGS. 1A-1B. Accordingly, the device 600 can be implemented at or as at least a part of the network device 110 or the terminal device 120.

As shown, the device 600 includes a processor 610, a memory 620 coupled to the processor 610, a suitable transmitter (TX) and receiver (RX) 640 coupled to the processor 610, and a communication interface coupled to the TX/RX 640. The memory 610 stores at least a part of a program 630. The TX/RX 640 is for bidirectional communications. The TX/RX 640 has at least one antenna to facilitate communication, though in practice an Access Node mentioned in this application may have several ones. The communication interface may represent any interface that is necessary for communication with other network elements, such as X2 interface for bidirectional communications between eNBs, S1 interface for communication between a Mobility Management Entity (MME)/Serving Gateway (S-GW) and the eNB, Un interface for communication between the eNB and a relay node (RN), or Uu interface for communication between the eNB and a terminal device.

The program 630 is assumed to include program instructions that, when executed by the associated processor 610, enable the device 600 to operate in accordance with the embodiments of the present disclosure, as discussed herein with reference to FIGS. 1A to 5. The embodiments herein may be implemented by computer software executable by the processor 610 of the device 600, or by hardware, or by a combination of software and hardware. The processor 610 may be configured to implement various embodiments of the present disclosure. Furthermore, a combination of the processor 610 and memory 620 may form processing means 650 adapted to implement various embodiments of the present disclosure.

The memory 620 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 620 is shown in the device 600, there may be several physically distinct memory modules in the device 600. The processor 610 may be of any type suitable to the local technical network, and may include one or more of general purpose computers, special purpose computers, microprocessors, digital signal processors (DSPs) and processors based on multicore processor architecture, as non-limiting examples. The device 600 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to FIGS. 2 and 5. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method performed by a terminal device, the method comprising:
receiving a Medium Access Control (MAC) Control Element (CE) activation command indicating at least one transmission configuration indication (TCI) state identifier (ID) with each TCI state ID indicating a first TCI state and a second TCI state;
receiving downlink control information (DCI) indicating the first TCI state and the second TCI state and a first value, a second value or a third value,
wherein, in response to the first value being received, the first value indicates that there is 1 demodulation reference signal (DMRS) port in a first code domain multiplexing (CDM) group and there are 2 DMRS ports in a second CDM group, 1 DMRS port in the first CDM group corresponds to the first TCI state, and 2 DMRS ports in the second CDM group correspond to the second TCI state,
wherein, in response to the second value being received, the second value indicates that there are 2 DMRS ports in the first CDM group and there is 1 DMRS port in the second CDM group, 2 DMRS ports in the first CDM group correspond to the first TCI state, and 1 DMRS port in the second CDM group corresponds to the second TCI state, and
wherein, in response to the third value being received, the third value indicates that there is one CDM group and one of the first TCI state and the second TCI state is applied to one physical downlink shared channel (PDSCH) transmission; and
receiving a DMRS based on the DCI.

2. The method of claim 1, wherein both the first value and the second value indicate a total of 3 DMRS ports.

3. The method of claim 1, wherein the MAC CE activation command activates a maximum number of 8 TCI state IDs.

4. A method performed by a terminal device, the method comprising:
receiving a Medium Access Control (MAC) Control Element (CE) activation command indicating at least one transmission configuration indication (TCI) state identifier (ID) with each TCI state ID indicating a first TCI state and a second TCI state; and
receiving downlink control information (DCI) indicating the first TCI state and the second TCI state and a value of a table,
wherein the table comprises a plurality of values, each associated with the number of demodulation reference signal (DMRS) code domain multiplexing (CDM) group(s) and at least one DMRS port in the DMRS CDM groups, the DMRS CDM group(s) including at least one of a first CDM group and a second CDM group,
wherein the first TCI state corresponds to the first CDM group, and the second TCI state corresponds to the second CDM group,
wherein, in response to the value being a first value, the first value indicates that there is 1 DMRS port in the first CDM group and there are 2 DMRS ports in the second CDM group, 1 DMRS port in the first CDM group corresponds to the first TCI state, and 2 DMRS ports in the second CDM group correspond to the second TCI state,
wherein, in response to the value being a second value, the second value indicates that there are 2 DMRS ports in the first CDM group and there is 1 DMRS port in the second CDM group, 2 DMRS ports in the first CDM group correspond to the first TCI state, and 1 DMRS port in the second CDM group corresponds to the second TCI state, and
wherein, in response to the value being a third value, the third value indicates that there is one CDM group and one of the first TCI state and the second TCI state is applied to one physical downlink shared channel (PDSCH) transmission.

5. The method of claim 4, wherein both the first value and the second value indicate a total of 3 DMRS ports.

6. The method of claim 4, wherein the MAC CE activation command activates a maximum number of 8 TCI state IDs.

7. A terminal device comprising:
a processor configured to cause the terminal device to:
receive a Medium Access Control (MAC) Control Element (CE) activation command indicating at least one transmission configuration indication (TCI) state identifier (ID) with each TCI state ID indicating a first TCI state and a second TCI state;
receive downlink control information (DCI) indicating the first TCI state and the second TCI state and a first value, a second value or a third value,
wherein, in response to the first value being received, the first value indicates that there is 1 demodulation reference signal (DMRS) port in a first code domain multiplexing (CDM) group and there are 2 DMRS ports in a second CDM group, 1 DMRS port in the first CDM group corresponds to the first TCI state, and 2 DMRS ports in the second CDM group correspond to the second TCI state,
wherein, in response to the second value being received, the second value indicates that there are 2 DMRS ports in the first CDM group and there is 1 DMRS port in the second CDM group, 2 DMRS ports in the first CDM group correspond to the first TCI state, and 1 DMRS port in the second CDM group corresponds to the second TCI state, and
wherein, in response to the third value being received, the third value indicates that there is one CDM group and one of the first TCI state and the second TCI state is applied to one physical downlink shared channel (PDSCH) transmission; and
receive a DMRS based on the DCI.

8. The terminal device of claim 7, wherein both the first value and the second value indicate a total of 3 DMRS ports.

9. The terminal device of claim 7, wherein the MAC CE activation command activates a maximum number of 8 TCI state IDs.

10. A terminal device comprising:
a processor configured to cause the terminal device to:
receive a Medium Access Control (MAC) Control Element (CE) activation command indicating at least one transmission configuration indication (TCI) state identifier (ID) with each TCI state ID indicating a first TCI state and a second TCI state; and
receive downlink control information (DCI) indicating the first TCI state and the second TCI state and a value of a table,
wherein the table comprises a plurality of values, each associated with the number of demodulation reference signal (DMRS) code domain multiplexing (CDM) group(s) and at least one DMRS port in the DMRS CDM group(s), the DMRS CDM group(s) including at least one of a first CDM group and a second CDM group,
wherein the first TCI state corresponds to the first CDM group, and the second TCI state corresponds to the second CDM group,
wherein, in response to the value being a first value, the first value indicates that there is 1 DMRS port in the first CDM group and there are 2 DMRS ports in the second CDM group, 1 DMRS port in the first CDM group corresponds to the first TCI state, and 2 DMRS ports in the second CDM group correspond to the second TCI state,
wherein, in response to the value being a second value, the second value indicates there are 2 DMRS ports in the first CDM group and there is 1 DMRS port in the second CDM group, 2 DMRS ports in the first CDM group correspond to the first TCI state, and 1 DMRS port in the second CDM group corresponds to the second TCI state, and
wherein in response to the value being a third value, the third value indicates that there is one CDM group and one of the first TCI state and the second TCI state is applied to one physical downlink shared channel (PDSCH) transmission.

11. The terminal device of claim 10, wherein both the first value and the second value indicate a total of 3 DMRS ports.

12. The terminal device of claim 10, wherein the MAC CE activation command activates a maximum number of 8 TCI state IDs.

13. A method performed by a network device, the method comprising:
transmitting a Medium Access Control (MAC) Control Element (CE) activation command indicating at least one transmission configuration indication (TCI) state identifier (ID) with each TCI state ID indicating a first TCI state and a second TCI state;
transmitting downlink control information (DCI) indicating the first TCI state and a second TCI state and a first value, a second value or a third value,
wherein the first value indicates that there is 1 demodulation reference signal (DMRS) port in a first code domain multiplexing (CDM) group and there are 2 DMRS ports in a second CDM group, 1 DMRS port in the first CDM group corresponds to the first TCI state, and 2 DMRS ports in the second CDM group correspond to the second TCI state,
wherein the second value indicates that there are 2 DMRS ports in the first CDM group and there is 1 DMRS port in the second CDM group, 2 DMRS ports in the first CDM group correspond to the first TCI state, and 1 DMRS port in the second CDM group corresponds to the second TCI state, and
wherein the third value indicates that there is one CDM group and one of the first TCI state and the second TCI state is applied to one physical downlink shared channel (PDSCH) transmission; and
transmitting a DMRS based on the DCI.

14. The method of claim 13, wherein both the first value and the second value indicate a total of 3 DMRS ports.

15. The method of claim 13, wherein the MAC CE activation command activates a maximum number of 8 TCI state IDs.

16. A method performed by a network device, the method comprising:
transmitting a Medium Access Control (MAC) Control Element (CE) activation command indicating at least one transmission configuration indication (TCI) state identifier (ID) with each TCI state ID indicating a first TCI state and a second TCI state;
transmitting downlink control information (DCI) indicating the first TCI state and the second TCI state and a value of a table,
wherein the table comprises a plurality of values, each associated with the number of demodulation reference signal (DMRS) code domain multiplexing (CDM)

group(s) and at least one DMRS port in the DMRS CDM group(s), the DMRS CDM group(s) including at least one of a first CDM group and a second CDM group, wherein the first TCI state corresponds to the first CDM group, and the second TCI state corresponds to the second CDM group, wherein the table comprises a first value, the first value indicating that there is 1 DMRS port in the first CDM group and there are 2 DMRS ports in the second CDM group, 1 DMRS port in the first CDM group corresponds to the first TCI state, and 2 DMRS ports in the second CDM group correspond to the second TCI state, wherein the table comprises a second value, the second value indicating that there are 2 DMRS ports in the first CDM group and there is 1 DMRS port in the second CDM group, 2 DMRS ports in the first CDM group correspond to the first TCI state, and 1 DMRS port in the second CDM group corresponds to the second TCI state, and wherein the table comprises a third value, the third value indicating that there is one CDM group and one of the first TCI state and the second TCI state is applied to one physical downlink shared channel (PDSCH) transmission.

17. The method of claim 16, wherein both the first value and the second value indicate a total of 3 DMRS ports.

18. The method of claim 16, wherein the MAC CE activation command activates a maximum number of 8 TCI state IDs.

* * * * *